United States Patent
Ju et al.

(10) Patent No.: US 12,507,128 B2
(45) Date of Patent: Dec. 23, 2025

(54) ELECTRONIC DEVICE AND METHOD FOR CONTROLLING COMMUNICATION IN VEHICLE BY ELECTRONIC DEVICE

(71) Applicant: SAMSUNG ELECTRONICS CO., LTD., Suwon-si (KR)

(72) Inventors: Seungbum Ju, Suwon-si (KR); Changwon Jang, Suwon-si (KR); Yoongoo Nam, Suwon-si (KR); Woong Lee, Suwon-si (KR); Yuseon Lee, Suwon-si (KR); Jaewoong Lee, Suwon-si (KR); Kiseung Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 451 days.

(21) Appl. No.: 18/088,008

(22) Filed: Dec. 23, 2022

(65) Prior Publication Data

US 2023/0217319 A1    Jul. 6, 2023

Related U.S. Application Data

(63) Continuation of application No. PCT/KR2022/020737, filed on Dec. 19, 2022.

(30) Foreign Application Priority Data

Dec. 30, 2021  (KR) .................. 10-2021-0193411
Jan. 24, 2022  (KR) .................. 10-2022-0010227

(51) Int. Cl.
*H04W 36/00*   (2009.01)
*H04W 36/06*   (2009.01)
*H04W 36/32*   (2009.01)

(52) U.S. Cl.
CPC ....... *H04W 36/0009* (2018.08); *H04W 36/06* (2013.01); *H04W 36/32* (2013.01)

(58) Field of Classification Search
None
See application file for complete search history.

(56) References Cited

U.S. PATENT DOCUMENTS 8,924,122 B2   12/2014  Shida
10,469,619 B2  11/2019  Shimizu et al.
(Continued)

FOREIGN PATENT DOCUMENTS

CN   112584348   3/2021
CN   112637815   4/2021
(Continued)

OTHER PUBLICATIONS

Oppo, "Discussion on Network Controlled Device to Device Communication Service," S2-1901551, SA WG2 Meeting #131, Feb. 19, 2019, 13 pages.
(Continued)

*Primary Examiner* — Kodzovi Acolatse
(74) *Attorney, Agent, or Firm* — Nixon & Vanderhye, P.C.

(57) ABSTRACT

Provided is an electronic device of a vehicle including a mobile communication module configured to transmit and/or receive data through a base station according to a first communication method based on a first frequency band, or a second communication method based on a second frequency band, and a control module configured to control an operation of the mobile communication module, wherein the control module is further configured to: determine whether there is a possibility of communication interruption with respect to the first communication method while data is being transmitted and received according to the first com- (Continued)

munication method through the mobile communication module, and, based on determining that there is the possibility of communication interruption, switch from the first communication method to the second communication method, and transmit and/or receive data, wherein the first frequency band is higher than the second frequency band.

18 Claims, 22 Drawing Sheets

(56) References Cited

U.S. PATENT DOCUMENTS

| | | | |
|---|---|---|---|
| 10,719,084 | B2 | 7/2020 | Yoon et al. |
| 11,229,070 | B2 | 1/2022 | Chae et al. |
| 2011/0258313 | A1 | 10/2011 | Mallik et al. |
| 2017/0086119 | A1* | 3/2017 | Xu ................... H04W 36/302 |
| 2020/0005650 | A1 | 1/2020 | Park |
| 2020/0092685 | A1* | 3/2020 | Fehrenbach .......... H04W 36/08 |
| 2020/0150684 | A1 | 5/2020 | Kim |
| 2020/0322016 | A1* | 10/2020 | Kim ..................... H04B 17/27 |
| 2020/0324792 | A1* | 10/2020 | Kunihiro ............... B60W 50/12 |
| 2020/0327813 | A1 | 10/2020 | Lim |
| 2021/0173392 | A1* | 6/2021 | Santos ................. G05D 1/0022 |
| 2021/0239783 | A1* | 8/2021 | Calcev ................. G01S 5/0215 |
| 2023/0180326 | A1* | 6/2023 | Zheng .................. H04W 76/18 370/225 |
| 2023/0288517 | A1* | 9/2023 | Walk .................... G01S 5/0218 |

FOREIGN PATENT DOCUMENTS

| | | |
|---|---|---|
| CN | 113747388 | 12/2021 |
| JP | 5668359 | 2/2015 |
| KR | 10-2019-0108121 | 9/2019 |
| KR | 10-2020-0123506 | 10/2020 |
| KR | 10-2177259 | 11/2020 |

OTHER PUBLICATIONS

Search Report and Written Opinion dated Mar. 21, 2023 in International Patent Application No. PCT/KR2022/020737.

Yao, Guidan et al., "Integrating Sub-6 GHz and Millimeter Wave to Combat Blockage: Delay-Optimal Scheduling," arXiv:1901. 00963v2 [cs.IT], Jan. 22, 2019, 13 pages.

Toyota Info Technology Center, "Discussion on beam management for NR-V2X sidelink in millimeter-wave bands," R1-1809039, 3GPP TSG RAN WG1 Meeting #94, Aug. 11, 2018, 9 pages.

Search Report and Written Opinion dated Mar. 21, 2023 issued in International Patent Application No. PCT/KR2022/020737.

Yao etc., "Integrating Sub-6 GHz and Millimeter Wave to Combat Blockage: Delay-Optimal Scheduling", Jan. 22, 2019, 12 pages.

Toyota Info Technology Center, "Discussion on beam management for NR-V2X sidelink in millimeter-wave bands", R1-1809039, 3GPP TSG RAN WG1 Meeting #94, Aug. 20, 2018, 7 pages.

OPPO, "Discussion on Network Controlled Device to Device Communication Service", S2-1901551, SAWG2 Meeting #131, Feb. 25, 2019, 11 pages.

* cited by examiner

| TYPE OF DATA | PRIORITY |
|---|---|
| SAFETY-RELATED DATA | 1 |
| DRIVING-RELATED DATA | 2 |
| USER DATA | 3 |

ELECTRONIC DEVICE AND METHOD FOR CONTROLLING COMMUNICATION IN VEHICLE BY ELECTRONIC DEVICE

CROSS-REFERENCE TO RELATED APPLICATIONS

This application is a continuation of International Application No. PCT/KR2022/020737 designating the United States, filed on Dec. 19, 2022, in the Korean Intellectual Property Receiving Office and claiming priority to Korean Patent Application No. 10-2021-0193411, filed on Dec. 30, 2021, in the Korean Intellectual Property Office, and to Korean Patent Application No. 10-2022-0010227, filed on Jan. 24, 2022, in the Korean Intellectual Property Office, the disclosures of all of which are incorporated by reference herein in their entireties.

BACKGROUND

Field

The disclosure relates to in-vehicle electrical equipment, and for example, to an electronic device to be mounted on a vehicle to control communication in the vehicle, and a method performed by the electronic device.

Description of Related Art

Platooning refers to a situation in which a plurality of vehicles make up a platoon and drive while exchanging information with each other through vehicle-to-everything (V2X) communication.

According to an implementation of platooning, the lead vehicle (or leader vehicle) may be driven by a professional driver, and the following vehicles (or member vehicles) may fully autonomously drive to follow the lead vehicle using the distance from the vehicle in front, lane information, and driving information of the vehicle in front, which are obtained through a sensor, such as a radar or a camera.

With the rapid growth of the logistics transportation market, the operation of heavy trucks has become more active, and research on platooning has been conducted to reduce costs due to increasing logistics traffic and to improve accident safety and productivity.

By minimizing and/or reducing the inter-vehicle distance in a platoon, air resistance may be reduced, and thus, fuel consumption of vehicles and exhaust gas may be reduced.

However, there is a possibility that communication between vehicles may be disrupted as the distance therebetween is reduced. For example, due to the advent of 5th Generation (5G) mobile communication using a millimeter wave (mmWave) band, communication failure due to the inter-vehicle distance may occur more frequently. This is because the mmWave band of 28 GHz to 100 GHz has a wider available continuous bandwidth than does the band below 6 GHz but also has a limitation in that data is transmitted or received only in line-of-sight (LOS) propagation due to the nature of radio waves, and communication may be interrupted by even only one leaf between beams of a base station and a communication module due to the shape of the beams.

Therefore, there is a need for a method of preventing/reducing communication interruption due to an inter-vehicle distance in a platoon of vehicles that are capable of performing mmWave-band communication.

SUMMARY

Embodiment of the disclosure provide an electronic device and a method, performed by the electronic device, of controlling communication in a vehicle to prevent and/or reduce communication failure occurring between vehicles in a platoon.

Embodiments of the disclosure provide an electronic device and the method, performed by the electronic device, of controlling communication in a vehicle switch to a communication method based on a low frequency band so as to ensure continuity of communication, when it is difficult to use a communication method based on a high frequency band.

Embodiments of the disclosure provide an electronic device and a method, performed by the electronic device, of controlling communication in a vehicle to stably process a large amount of data even when high data throughput is required while using a communication method based on a low frequency band.

According to an example embodiment of the disclosure, an electronic device of a vehicle includes: a mobile communication module configured to transmit and/or receive data through a base station according to a first communication method based on a first frequency band, or a second communication method based on a second frequency band, and a control module configured to control an operation of the mobile communication module, wherein the control module is further configured to: determine whether there is a possibility of communication interruption with respect to the first communication method while data is being transmitted and/or received according to the first communication method through the mobile communication module, and, based on determining that there is the possibility of communication interruption, switch from the first communication method to the second communication method, and transmit and/or receive data by the second communication method, wherein the first frequency band is higher than the second frequency band.

According to various example embodiments of the disclosure, an electronic device and a method, performed by the electronic device, of controlling communication in a vehicle may prevent and/or reduce communication failure occurring between vehicles in a platoon.

According to various example embodiments of the disclosure, when it is difficult to use a communication method based on a high frequency band, the electronic device and the method, performed by the electronic device, of controlling communication in a vehicle may switch to a communication method based on a low frequency band so as to ensure continuity of communication.

According to various example embodiments of the disclosure, the electronic device and the method, performed by the electronic device, of controlling communication in a vehicle may stably process a large amount of data even when high data throughput is required while using a communication method based on a low frequency band.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
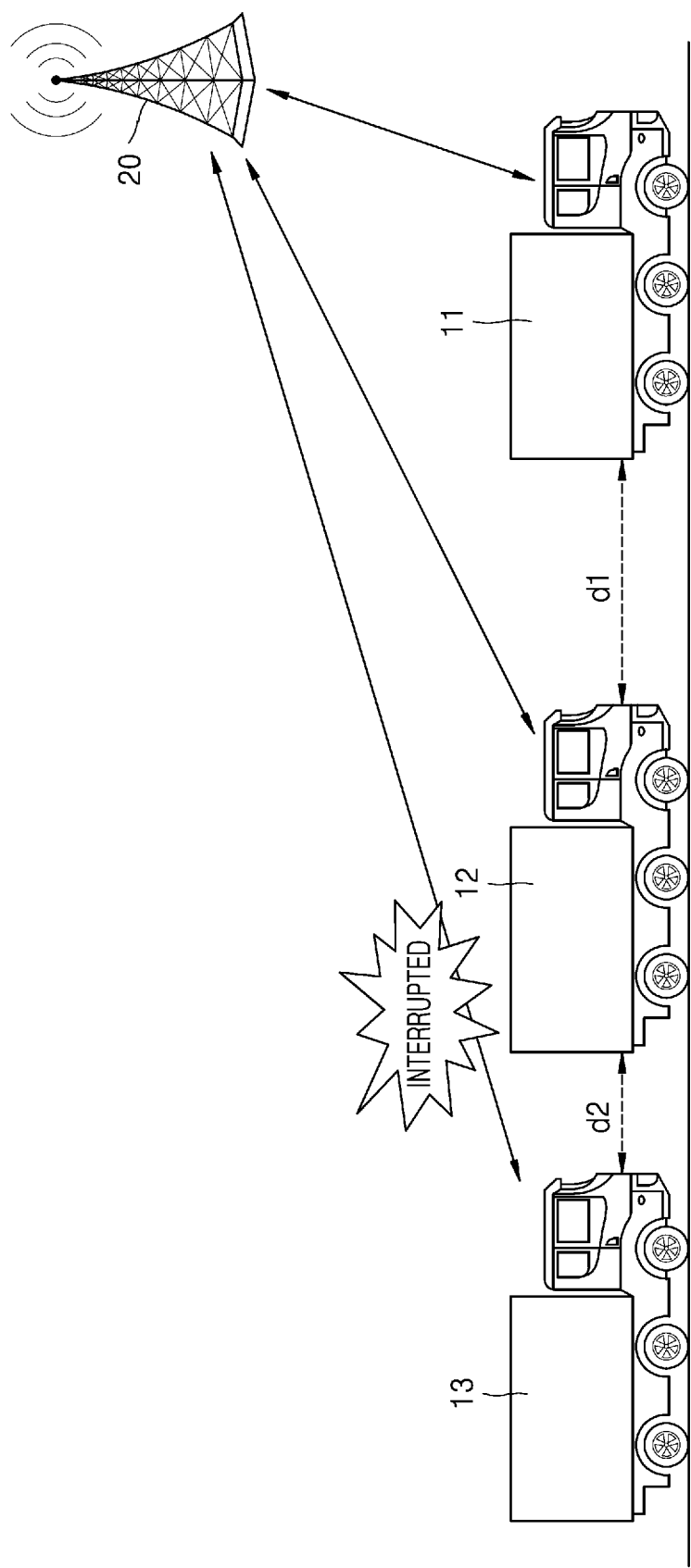
FIG. 1 is a diagram illustrating a situation in which communication between vehicles in a platoon is interrupted.

According to various example embodiments of the disclosure, an electronic device of a vehicle may include: a mobile communication module configured to transmit and/or receive data through a base station according to a first communication method based on a first frequency band, or a second communication method based on a second frequency band, and a control module configured to control an operation of the mobile communication module, wherein the control module is further configured to: determine whether there is a possibility of communication interruption with respect to the first communication method while data is being transmitted and received according to the first communication method through the mobile communication module, and, based on determining that there is the possibility of communication interruption, switch from the first communication method to the second communication method, and transmit and/or receive data using the second communication method, wherein the first frequency band is higher than the second frequency band.

In an example embodiment of the disclosure, the first communication method may include a $5^{th}$ Generation (5G) communication method based on a millimeter wave (mm-Wave) band, and the second communication method may include a 5G communication method based on a band of 6 GHz or less (a sub-6 band), a $4^{th}$ Generation (4G) communication method, or a $3^{rd}$ Generation (3G) communication method.

In an example embodiment of the disclosure, the control module may be further configured to: determine whether there is the possibility of communication interruption, based on at least one of a distance between an obstacle and the vehicle, a size of the obstacle, a performance index value of a signal received from the base station, a position of an antenna module of the mobile communication module, or a traveling direction of a beam for the first communication method.

In an example embodiment of the disclosure, the control module may be further configured to, based on there being no obstacle on the traveling direction of the beam for the first communication method, determine that there is no possibility of communication interruption.

In an example embodiment of the disclosure, the control module may be further configured to, based on there being an obstacle on the traveling direction of the beam for the first communication method, determine, based on a distance between the vehicle and the obstacle and a size of the obstacle, whether there is the possibility of communication interruption.

In an example embodiment of the disclosure, the control module may be further configured to, based on the distance between the vehicle and the obstacle being less than or equal to a threshold distance, determined according to the size of the obstacle, determine that there is the possibility of communication interruption.

In an example embodiment of the disclosure, the control module may be further configured to, based on the distance between the vehicle and the obstacle being less than or equal to a threshold distance, determined according to a difference between a height of the obstacle and a height of an antenna module of the mobile communication module, determine that there is the possibility of communication interruption.

In an example embodiment of the disclosure, the control module may be further configured to, based on a performance index value of a signal received from the base station being less than or equal to a threshold value, determine that there is the possibility of communication interruption.

In an example embodiment of the disclosure, the electronic device may further include: a device-to-device (D2D) communication module configured to transmit and/or receive data to and from another electronic device using a D2D communication method, and the control module may be further configured to, based on reception of at least a specified amount of data being required during data transmission or reception according to the second communication method, transmit, to an electronic device of another vehicle using the first communication method, a request for required data through the D2D communication module.

In an example embodiment of the disclosure, the control module may be further configured to obtain, from a leader vehicle performing platooning, information about vehicles using the first communication method, and transmit, to an electronic device of a nearest vehicle among the vehicles using the first communication method, the request for the required data through the D2D communication module.

In an example embodiment of the disclosure, the control module may be further configured to obtain, from a leader vehicle performing platooning, information about vehicles using the first communication method, and transmit, to an electronic device of a vehicle having a highest signal strength according to the D2D communication method among the vehicles using the first communication method, the request for the required data through the D2D communication module.

In an example embodiment of the disclosure, the control module may be further configured to: classify, based on priority, the required data into first data and second data, transmit a request for the first data, to the electronic device of the another vehicle according to the D2D communication method, and transmit a request for the second data to the base station according to the second communication method, wherein a priority of the first data may be higher than a priority of the second data.

According to an example embodiment of the disclosure, a method, performed by an electronic device of a vehicle, of controlling communication may include: transmitting and/or receiving data through a base station according to a first communication method, based on a first frequency band, determining whether there is a possibility of communication interruption with respect to the first communication method, and based on determining that there is the possibility of communication interruption, switching from the first communication method to a second communication method, based on a second frequency band, and transmitting and/or receiving data using the second communication method, wherein the first frequency band is higher than the second frequency band.

In an example embodiment of the disclosure, the first communication method may include a 5G communication method based on a millimeter wave (mmWave) band, and the second communication method may include a 5G communication method based on a band of 6 GHz or less (a sub-6 band), a $4^{th}$ Generation (4G) communication method, or a $3^{rd}$ Generation (3G) communication method In an example embodiment of the disclosure, the determining may include determining whether there is the possibility of communication interruption, based on at least one of a distance between an obstacle and the vehicle, a size of the obstacle, a performance index value of a signal received from the base station, a position of an antenna module of the electronic device, or a traveling direction of a beam for the first communication method.

In an example embodiment of the disclosure, the method may further include, based on reception of at least a specified amount of data being required during data transmission or reception according to the second communication method, transmitting, to an electronic device of another vehicle using the first communication method, a request for required data according to a D2D communication method.

In an example embodiment of the disclosure, the transmitting of the request for the required data may include: obtaining, from a leader vehicle performing platooning, information about vehicles using the first communication method, and transmitting the request for the required data, to an electronic device of a nearest vehicle among the vehicles using the first communication method.

In an example embodiment of the disclosure, the transmitting of the request for the required data may include: obtaining, from a leader vehicle performing platooning, information about vehicles using the first communication method, and transmitting the request for the required data, to an electronic device of a vehicle having a highest signal strength according to the D2D communication method among the vehicles using the first communication method.

In an example embodiment of the disclosure, the transmitting of the request for the required data may include: classifying, based on priority, the required data into first data and second data, transmitting a request for the first data, to the electronic device of the another vehicle according to the D2D communication method, and transmitting a request for the second data to the base station according to the second communication method, wherein a priority of the first data may be higher than a priority of the second data.

As the disclosure allows for various changes and various example embodiments, certain embodiments of the disclosure will be illustrated in the drawings and described in greater detail. However, this is not intended to limit the disclosure, and it should be understood that all changes, equivalents, and substitutes that do not depart from the spirit and technical scope of the disclosure are encompassed in the disclosure.

In describing an embodiment of the disclosure, detailed explanations of the related art may be omitted when it is deemed that they may unnecessarily obscure the gist of the disclosure. Also, numbers (e.g., 'first' and 'second') used in the description of the disclosure are intended to merely distinguish one component from another.

Throughout the disclosure, the expression "at least one of a, b, or c" indicates only a, only b, only c, both a and b, both a and c, both b and c, all of a, b, and c, or variations thereof.

In addition, as used herein, it should be understood that when components are "connected" or "coupled" to each other, the components may be directly connected or coupled to each other, but may alternatively be connected or coupled to each other with a component therebetween, unless specified otherwise.

Also, as used herein, a component expressed as, for example, '... er (or)', '... unit', '... module', or the like, may denote a unit in which two or more components are combined into one component or one component is divided into two or more components according to its function. In addition, each component to be described below may additionally perform, in addition to its primary function, some or all of functions of other components take charge of, and some functions among primary functions of the respective components may be exclusively performed by other components.

FIG. 1 is a diagram illustrating a situation in which communication between vehicles in a platoon is interrupted.

As illustrated in FIG. 1, a first vehicle 11, a second vehicle 12, and a third vehicle 13 may travel while communicating with a base station 20.

A vehicle predetermined (e.g., specified) as a leader vehicle (e.g., the foremost first vehicle 11) among the vehicles 11, 12, and 13 in the platoon may transmit, to the member vehicles, data necessary for platooning.

As described above, a minimized/reduced inter-vehicle distance in the platoon may reduce air resistance and thus, the fuel consumption of the vehicles may be reduced, however, as the distance between the vehicles decreases, communication failure may occur.

For example, a distance d1 between the first vehicle 11 and the second vehicle 12 may be long enough, and thus the first vehicle 11 does not interfere with communication of the second vehicle 12, whereas a distance d2 between the vehicle 12 and the third vehicle 13 is short, and thus, the second vehicle 12 may interfere with communication of the third vehicle 13.

When a communication failure occurs in the third vehicle 13, safety problems may occur, and thus, there is a need for a method for preventing/reducing the continuity of communication of the third vehicle 13 from being interrupted due to an obstacle, such as the second vehicle 12.

Hereinafter, various example embodiments of the disclosure will be described with reference to FIGS. 2 to 15, in which an electronic device 200 mounted on the third vehicle 13 (hereinafter, referred to as the current vehicle 13) controls a communication method to maintain the continuity of communication.

Figure 2:
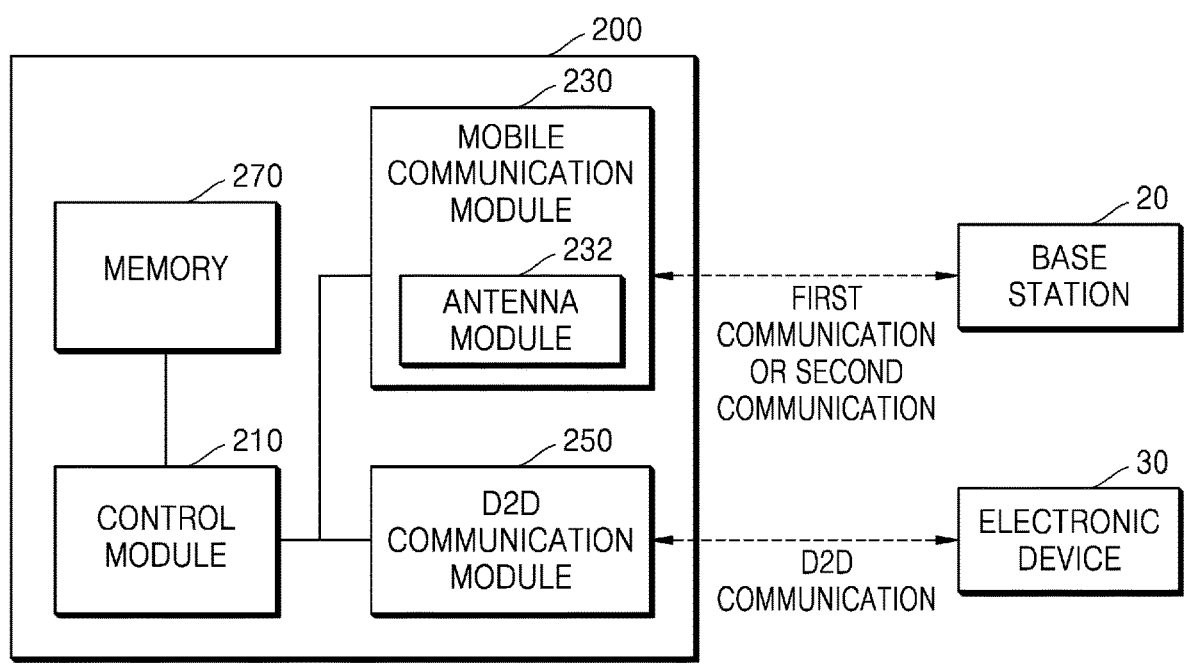
FIG. 2 is a block diagram illustrating an example configuration of an electronic device according to various embodiments.

FIG. 2 is a block diagram illustrating an example configuration of the electronic device 200 according to various embodiments.

Referring to FIG. 2, the electronic device 200 may include a control module (e.g., including control and/or processing circuitry) 210, a mobile communication module (e.g., including mobile communication circuitry) 230, a device-to-device (D2D) communication module (e.g., including communication circuitry) 250, and a memory 270.

The control module 210, the mobile communication module 230, and the D2D communication module 250 may be implemented as a processor. The processor may be referred to as an electronic control unit (ECU).

The control module 210, the mobile communication module 230, and the D2D communication module 250 may operate according to at least one instruction stored in the memory 270.

The control module 210 may include various control circuitry and controls operations of the mobile communication module 230 and the D2D communication module 250. The control module 210 may select a communication method to be used for transmitting and receiving data, and cause the mobile communication module 230 and/or the D2D communication module 250 to operate according to the selected communication method.

Hereinafter, that the control module 210 transmits and receives data according to a certain communication method may refer, for example, to the control module 210 controlling the mobile communication module 230 and/or the D2D communication module 250 to transmit and receive the data.

The mobile communication module 230 transmits and receives data to and from the base station 20 using a first communication method or a second communication method.

The first communication method is based on a first frequency band, and the second communication method is based on a second frequency band. In an embodiment of the disclosure, the first frequency band may be higher than the second frequency band. That the first frequency band is higher than the second frequency band may refer, for example, to the highest frequency included in the first frequency band being greater than the highest frequency included in the second frequency band.

For example, the first communication method may be a $5^{th}$ Generation (5G) communication method based on a millimeter wave (mmWave) band, and the second communication method may be a 5G communication method, a $4^{th}$ Generation (4G) communication method, or a $3^{rd}$ Generation (3G) communication method based on a band of 6 GHz or less (e.g., a sub-6 band).

In general, the higher the frequency band, the higher the straightness and speed of a signal, and the more data may be transmitted and received. However, there are disadvantages in that the signal has a short range and is highly likely to be interrupted by an obstacle. Accordingly, the first communication method usable by the mobile communication module 230 allows for transmission of a larger amount of data and a higher data transmission amount than does the second communication method, but is more vulnerable to communication interruption than is the second communication method.

The control module 210 may control the communication method of the mobile communication module 230 according to the state of the current vehicle 13 to maintain continuous communication.

For example, when the control module 210 selects the first communication method, the mobile communication module 230 may transmit and receive data to and from the base station 20 according to the first communication method, and when the control module 210 selects the second communication method as there is a risk of communication interruption, the mobile communication module 230 may transmit and receive data to and from the base station 20 according to the second communication method.

The mobile communication module 230 includes an antenna module (e.g., including at least one antenna) 232. The antenna module 232 may generate a beam for the first communication method or the second communication method. Controlling the traveling direction, shape, or the like of a beam may be referred to as beamforming.

The D2D communication module 250 includes various communication circuitry and transmits and receives data through D2D communication with another electronic device 30.

In an embodiment of the disclosure, D2D communication methods may include, for example, and without limitation, Wi-Fi Direct communication, Bluetooth communication, Long-Term Evolution (LTE)-based D2D communication, etc., but these are only examples, and the D2D communication methods may include various communication methods that enable direct communication between devices without going through a network infrastructure, such as the base station 20 or an access point (AP).

Figure 3:
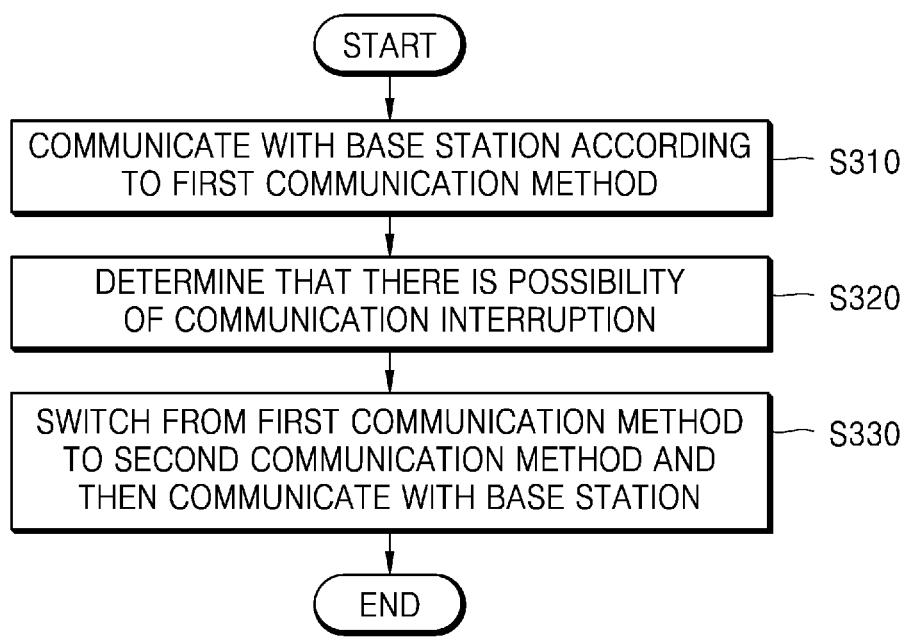
FIG. 3 is a flowchart illustrating an example communication control method according to various embodiments.

FIG. 3 is a flowchart illustrating an example communication control method performed by the electronic device 200, according to various embodiments.

In operation S310, the control module 210 communicates with the base station 20 according to the first communication method among the first communication method and the second communication method of the mobile communication module 230. For example, the control module 210 first performs communication using the first communication method that provides a higher communication speed than does the second communication method.

Data received through the base station 20 may include, for example, user data (e.g., image data or music data), safety-related data (e.g., data regarding surrounding obstacle information, data regarding whether an accident has occurred, or data regarding pedestrians) and/or driving-related data (e.g., driving route data or weather data).

The control module 210 may request, from the base station 20, necessary data using the first communication method of the mobile communication module 230, and the base station 20 may transmit, to the mobile communication module 230, the data received from an external device.

In operation S320, the control module 210 determines whether there is a possibility of communication interruption while communication is performed according to the first communication method.

In an embodiment of the disclosure, the control module 210 may determine whether there is a possibility of communication interruption, based, for example, on at least one of the distance between a surrounding obstacle (e.g., the vehicle in front) and the current vehicle 13, the size of the surrounding obstacle (e.g., the height or width of the surrounding obstacle, or the area of the surrounding obstacle viewed from the current vehicle 13), a performance indicator value of a signal received from the base station 20, the position of the antenna module 232 installed in the current vehicle 13 (e.g., the height of the antenna module 232), or the traveling direction of a beam for the first communication method.

The control module 210 may determine the distance between the current vehicle 13 and a surrounding obstacle, the size of the surrounding obstacle, and the like, based on sensing data obtained from sensors mounted on the current vehicle 13. Here, the sensors mounted on the current vehicle 13 may include, but are not limited to, a camera sensor, an infrared sensor, a light detection and ranging (LiDAR) sensor, and the like.

A method of determining whether there is a possibility of communication interruption is described in greater detail below with reference to FIGS. 5 to 8.

In operation S330, when it is determined that there is a possibility of communication interruption with respect to the first communication method, the control module 210 switches from the first communication method to the second communication method and then communicates with the base station 20.

As described above, because the second communication method is based on a lower frequency band than is the first communication method, the possibility of communication interruption with respect to the first communication method may not be applied to the second communication method.

In an embodiment of the disclosure, in a case in which the mobile communication module 230 supports only the first communication method, for example, in a case in which the mobile communication module 230 does not support the second communication method, the control module 210 may transmit and receive data to and from the electronic device 30 through the D2D communication module 250 as it is determined that there is a possibility of communication interruption with respect to the first communication method. In this case, the electronic device 30 may provide the electronic device 200 of the current vehicle 13 with data received from the base station 20 according to the first communication method or the second communication method using a D2D communication method.

In an embodiment of the disclosure, in a case in which the mobile communication module 230 supports only the second communication method, for example, in a case in which the mobile communication module 230 does not support the first communication method, the control module 210 may transmit and receive data according to the second communication method without determining whether there is a possibility of communication interruption. In addition, when necessary (e.g., when a high throughput is required), the control module 210 may transmit and receive data to and from the electronic device 30 through the D2D communication module 250.

Figure 4:
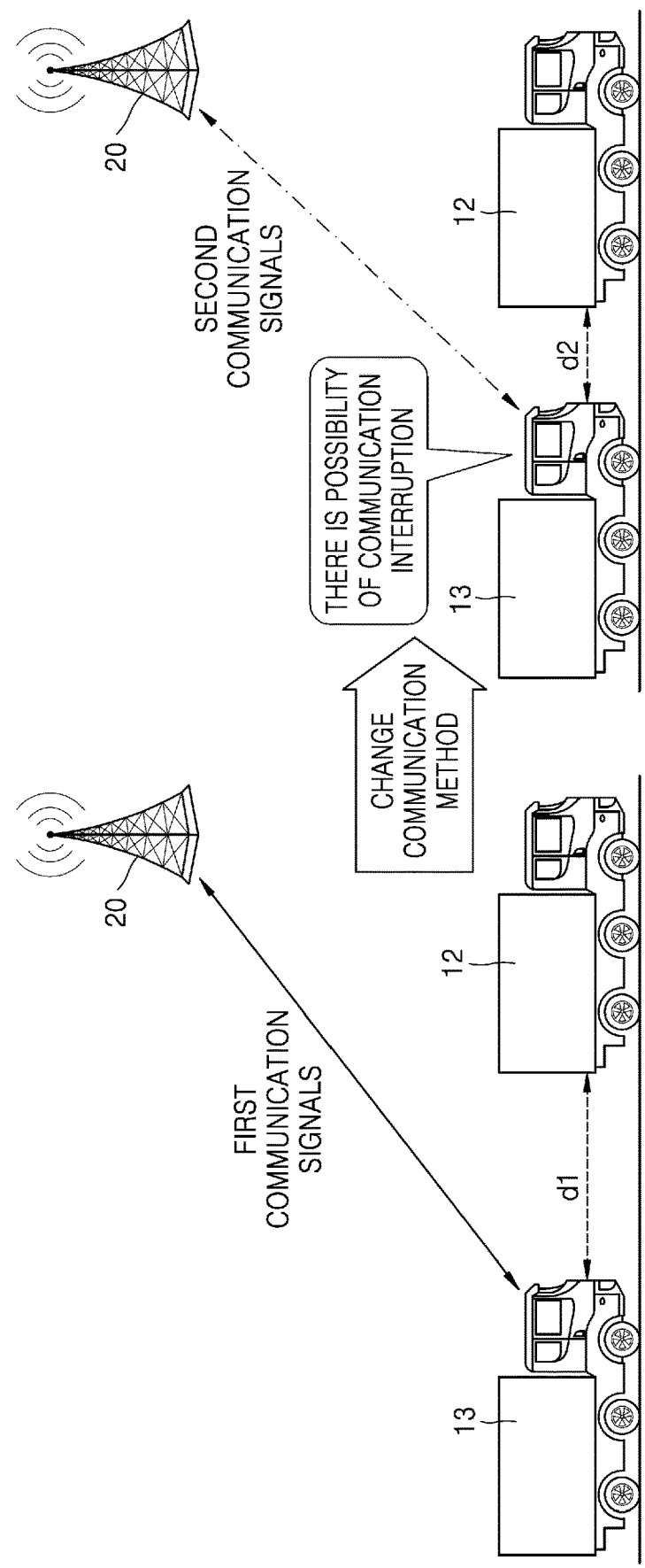
FIG. 4 is a diagram illustrating an example process of changing a communication method of a vehicle when it is determined that there is a possibility of communication interruption, according to various embodiments.

FIG. 4 is a diagram illustrating an example process of changing a communication method of a vehicle when it is determined that there is a possibility of communication interruption, according to various embodiments.

As illustrated in the left part of FIG. 4, when the distance d1 between the current vehicle 13 and the vehicle 12 in front is sufficiently long, the electronic device 200 may determine that there is no possibility of communication interruption with respect to the first communication method, and transmit and receive first communication signals to and from the base station 20 according to the first communication method.

When the inter-vehicle distance reaches d2 as the distance between the current vehicle 13 and the vehicle 12 in front gradually decreases, the electronic device 200 may determine that there is a possibility of communication interruption with respect to the first communication method, the electronic device 200 may transmit and receive second communication signals to and from the base station 20 according to the second communication method. Accordingly, the possibility of communication interruption in the current vehicle 13 due to the short distance between the current vehicle 13 and the vehicle 12 in front may be reduced.

Hereinafter, a method of determining whether there is a possibility of communication interruption is described in greater detail below with reference to FIGS. 5 to 8.

Figure 5:
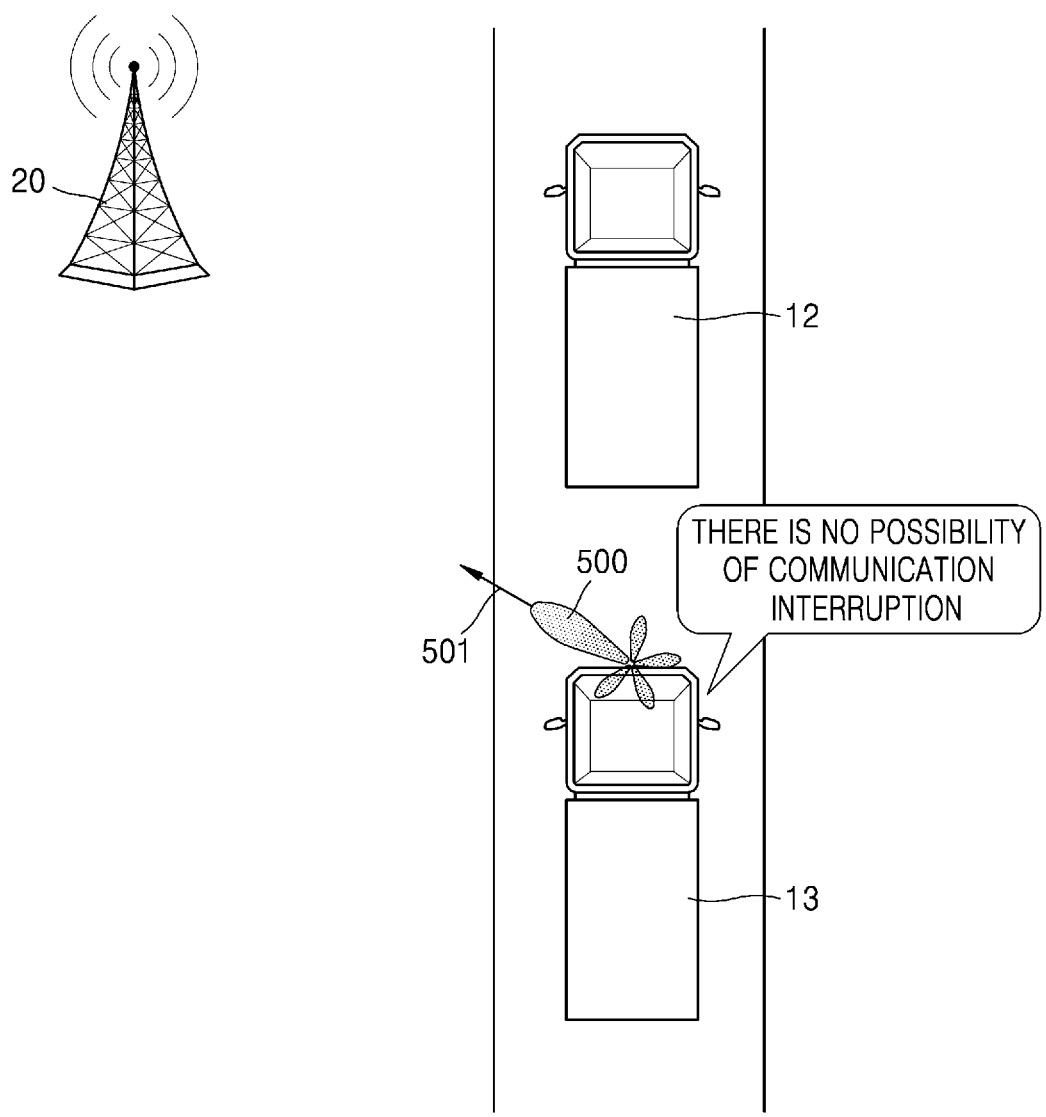
FIG. 5 is a diagram illustrating an example method of determining whether there is a possibility of communication interruption, according to various embodiments.
Figure 6:
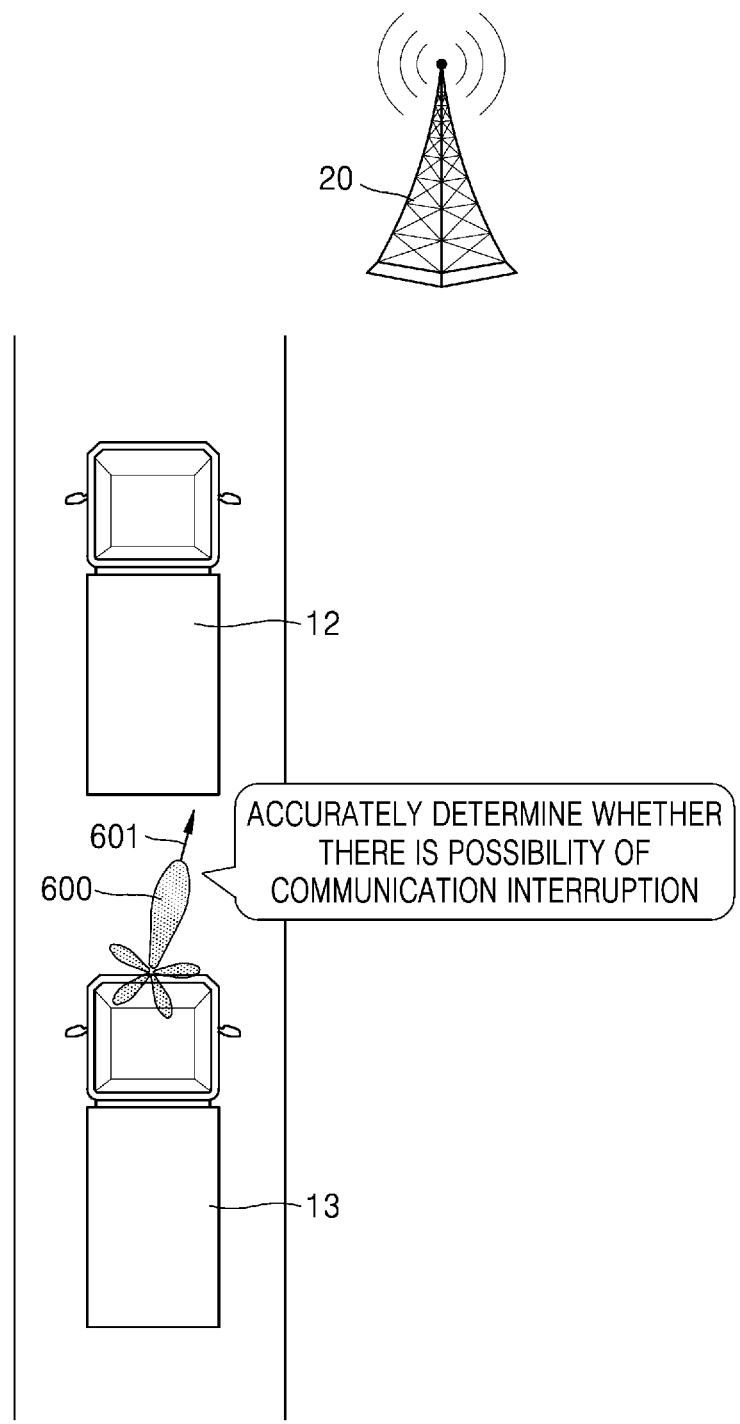
FIG. 6 is a diagram illustrating an example method of determining whether there is a possibility of communication interruption, according to various embodiments.

FIGS. 5 and 6 are diagrams illustrating an example method of determining whether there is a possibility of communication interruption, according to various embodiments.

In an embodiment of the disclosure, the control module 210 may determine whether there is a possibility of communication interruption considering a traveling direction 501 of a beam 500 for the first communication method and the positions of surrounding obstacles.

In order to perform communication according to the first communication method, the beam 500 needs to be directed to a target to be communicated with, and thus, in general, the beam 500 may be directed to the base station 20. Accordingly, when an obstacle is on the traveling direction 501 of the beam 500, it may be determined that there is a possibility of communication interruption with respect to the first communication method.

Referring to FIG. 5, a surrounding obstacle, for example, the vehicle 12 in front is in front of the current vehicle 13, but the beam 500 is traveling towards the upper left corner, and thus, the control module 210 may determine that there is no possibility of communication interruption, and communicate with the base station 20 according to the first communication method. That is, the control module 210 may maintain a communication state according to the first communication method without switching to the second communication method.

Referring to FIG. 6, the vehicle 12 in front is in front of the current vehicle 13, and a beam 600 is traveling towards the upper right corner. As illustrated in FIG. 6, the vehicle 12 in front is on a traveling direction 601 of the beam 600, and thus, the control module 210 may determine that there is a possibility of communication interruption. In this case, the control module 210 may switch from the first communication method to the second communication method.

In an embodiment of the disclosure, there may be no possibility of communication interruption even when there is an obstacle on the traveling direction of the beam. For example, when the distance between the current vehicle 13 and the obstacle on the traveling direction of the beam is sufficiently long or the size of the obstacle is small, there may be no possibility of communication interruption. Hereinafter, a method of accurately determining whether there is a possibility of communication interruption is described in greater detail below with reference to FIG. 7A and FIG. 7B.

Figure 7A:
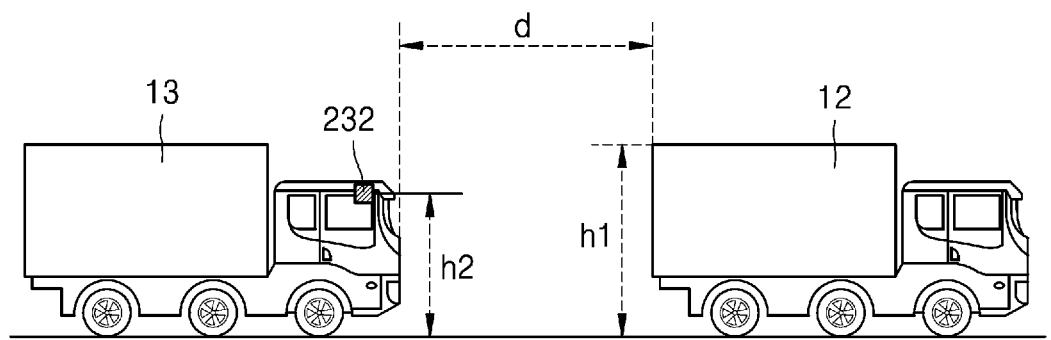
FIG. 7A and FIG. 7B are diagrams illustrating an example method of determining whether there is a possibility of communication interruption when a vehicle is on the traveling direction of a beam, according to various embodiments.
Figure 7B:
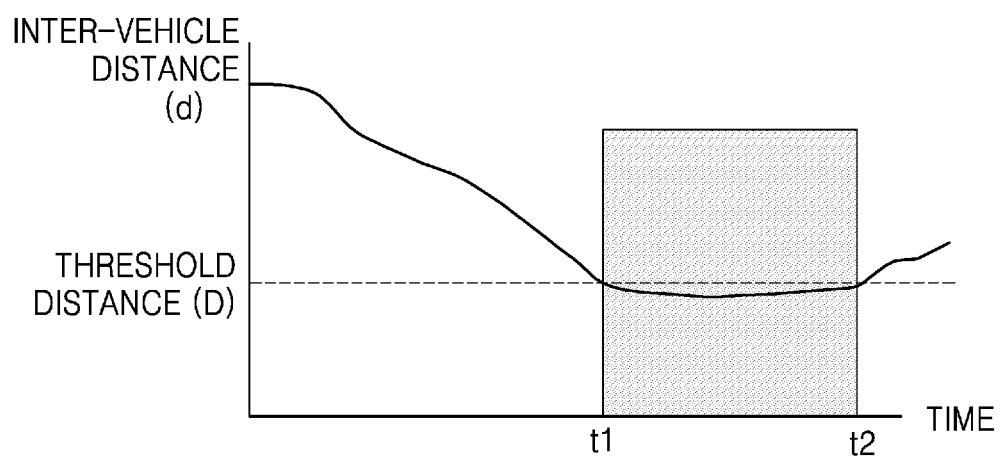

FIG. 7A and FIG. 7B are diagrams illustrating an example method of determining whether there is a possibility of communication interruption when an obstacle is on the traveling direction of a beam, according to various embodiments.

In an embodiment of the disclosure, when an obstacle is on the traveling direction of the beam, the control module 210 may determine whether there is a possibility of communication interruption, considering the distance between the current vehicle 13 and the obstacle, the size of the obstacle (e.g., the height or width of the obstacle), and the position of the antenna module 232 installed in the current vehicle 13 (e.g., the height of the antenna module 232).

For example, the control module 210 may determine that there is a possibility of communication interruption when the distance (d) between the current vehicle 13 and the obstacle is less than or equal to a preset threshold distance, and may determine that there is no possibility of communication interruption when the distance (d) between the current vehicle 13 and the obstacle is greater than the preset (e.g., specified) threshold distance.

As another example, the control module 210 may determine the threshold distance based on the size of the obstacle. In this case, the threshold distance may be inversely proportional to the size of the obstacle. For example, as the size of the obstacle increases, the threshold distance may decrease. This reflects the tendency that the larger the size of the obstacle, the higher the probability of communication interruption.

The control module 210 may determine that there is a possibility of communication interruption when the distance between the current vehicle 13 and the obstacle is less than or equal to the threshold distance that is determined based on the size of the obstacle, and may determine that there is no possibility of communication interruption when the distance between the current vehicle 13 and the obstacle is greater than the threshold distance that is determined based on the size of the obstacle.

As another example, the control module 210 may determine the threshold distance based on the size of the obstacle and the position of the antenna module 232. For example, the control module 210 may determine the threshold distance according to the difference between the height of the obstacle and the height of the antenna module 232, and in this case, the height of the obstacle needs to be greater than the height of the antenna module 232. When the height of the obstacle is less than the height of the antenna module 232, the control module 210 may determine that there is no possibility of communication interruption.

Referring to FIG. 7A, the distance between the current vehicle 13 and the vehicle 12 in front is d, the height of the vehicle 12 in front is h1, and the height of the antenna module 232 is h2. When h2 is greater than h1, there may be no possibility of communication interruption regardless of the distance d between the current vehicle 13 and the vehicle 12 in front.

When h1 is greater than h2, the control module 210 may determine a threshold distance D based on the difference between h1 and h2. The threshold distance D may be inversely proportional to the difference between h1 and h2.

Referring to FIG. 7B, the control module 210 may determine that there is a possibility of communication interruption in a period in which the distance d between the current vehicle 13 and the vehicle 12 in front is less than or equal to the threshold distance D, e.g., in the period between t1 and t2. The control module 210 may determine that there is no possibility of communication interruption in a period in which the distance d between the current vehicle 13 and the vehicle 12 in front is greater than the threshold distance D.

In an embodiment of the disclosure, the control module 210 may determine whether there is a possibility of communication interruption, considering the distance between the current vehicle 13 and the obstacle, the size of the obstacle, and the position of the antenna module 232 installed in the current vehicle 13, without determining whether an obstacle is on the traveling direction of the beam. In other words, regardless of the traveling direction of the beam, the control module 210 may determine that there is a possibility of communication interruption when the distance between the current vehicle 13 and the obstacle is less than or equal to the threshold distance that is determined according to the size of the obstacle, and may determine that there is no possibility of communication interruption when the distance between the current vehicle 13 and the obstacle is greater than the threshold distance that is determined according to the size of the obstacle.

Figure 8A:
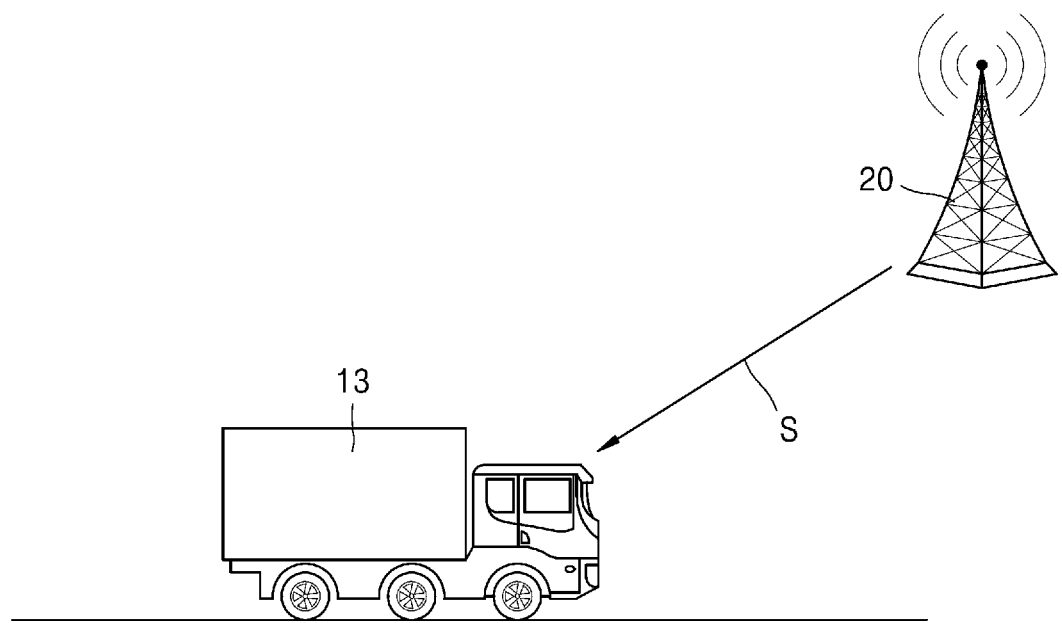
FIG. 8A and FIG. 8B are diagrams illustrating an example method of determining whether there is a possibility of communication interruption, according to various embodiments.
Figure 8B:
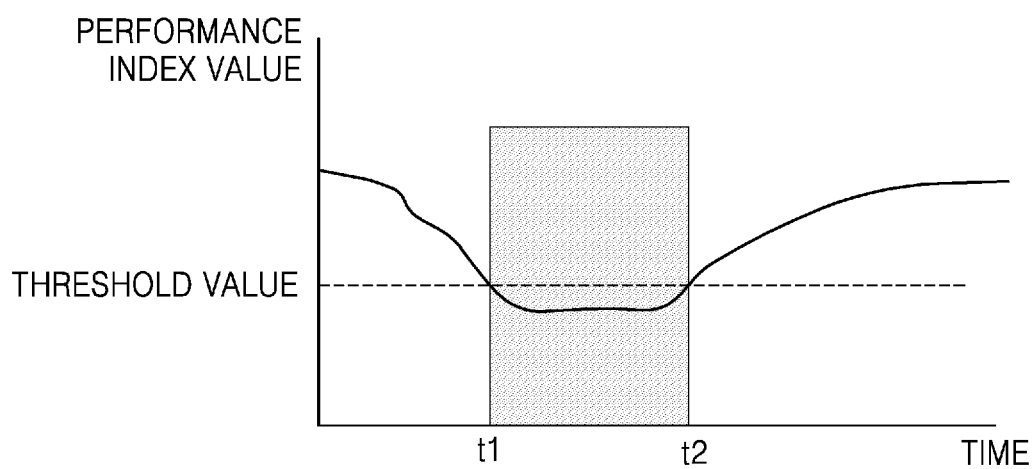

FIG. 8A and FIG. 8B are diagrams illustrating an example method of determining whether there is a possibility of communication interruption, according to various embodiments.

Referring to FIG. 8A, the control module 210 may determine whether there is a possibility of communication interruption, according to a performance index value of a signal S (e.g., a reference signal) received from the base station 20 according to the first communication method.

The performance index value of the signal S may include, for example, at least one of a reference signal received power (RSRP), a received signal strength indicator (RSSI), a reference signal received quality (RSRQ), or a signal-to-interference-plus-noise ratio (SINR), but is not limited thereto.

As illustrated in FIG. 8B, the control module 210 may compare the performance index value of the signal S with a preset threshold value, and determine that there is a probability of communication interruption in the period between t1 and t2 in which the performance index value is less than or equal to the threshold value. In addition, the control module 210 may determine that there is no possibility of communication interruption in a period in which the performance index value is greater than the threshold value.

Figure 9:
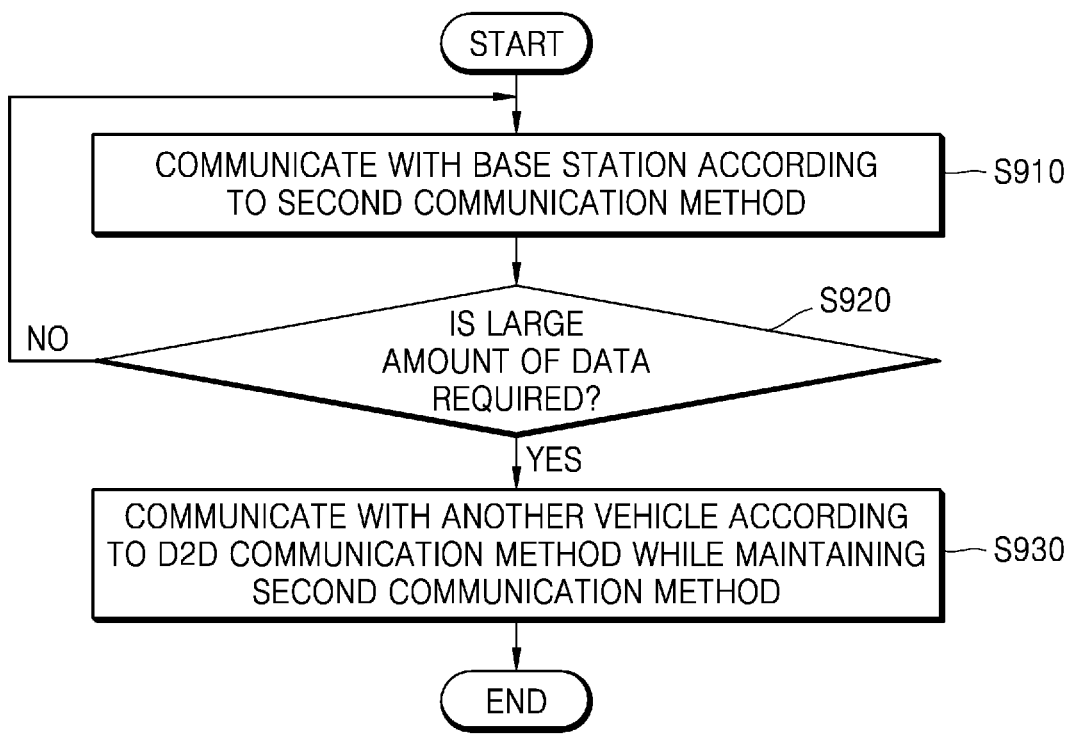
FIG. 9 is a flowchart illustrating an example communication control method according to various embodiments.

FIG. 9 is a flowchart illustrating an example communication control method according to various embodiments.

The flowchart of FIG. 9 illustrates a communication process performed by the electronic device 200 having switched from the first communication method to the second communication method, or performed by the electronic device 200 that does not support the first communication method.

In operation S910, the control module 210 communicates with the base station 20 according to the second communication method.

In operation S920, the control module 210 determines whether reception of a large amount of data is required (or whether a high throughput is required).

When reception of at least a preset amount of data is required, the control module 210 may determine that reception of a large amount of data is required. For example, when a service of streaming a large-size video is required, the control module 210 may determine that reception of a large amount of data is required.

When reception of a large amount of data is not required, the control module 210 maintains the communication according to the second communication method.

In operation S930, when reception of a large amount of data is required, the control module 210 may communicate with an electronic device of another vehicle according to a D2D communication method while maintaining the communication according to the second communication method. In this case, the other vehicle may transmit, to the electronic device 200 of the current vehicle 13, received data according to the first communication method or the second communication method.

The control module 210 transmits and receives data using the second communication method and the D2D communication method together, and thus may receive a large amount of data faster than using only the second communication method.

Hereinafter, a communication process performed in a situation in which a large amount of data is required is described in greater detail with reference to FIGS. 10 to 13.

Figure 10:
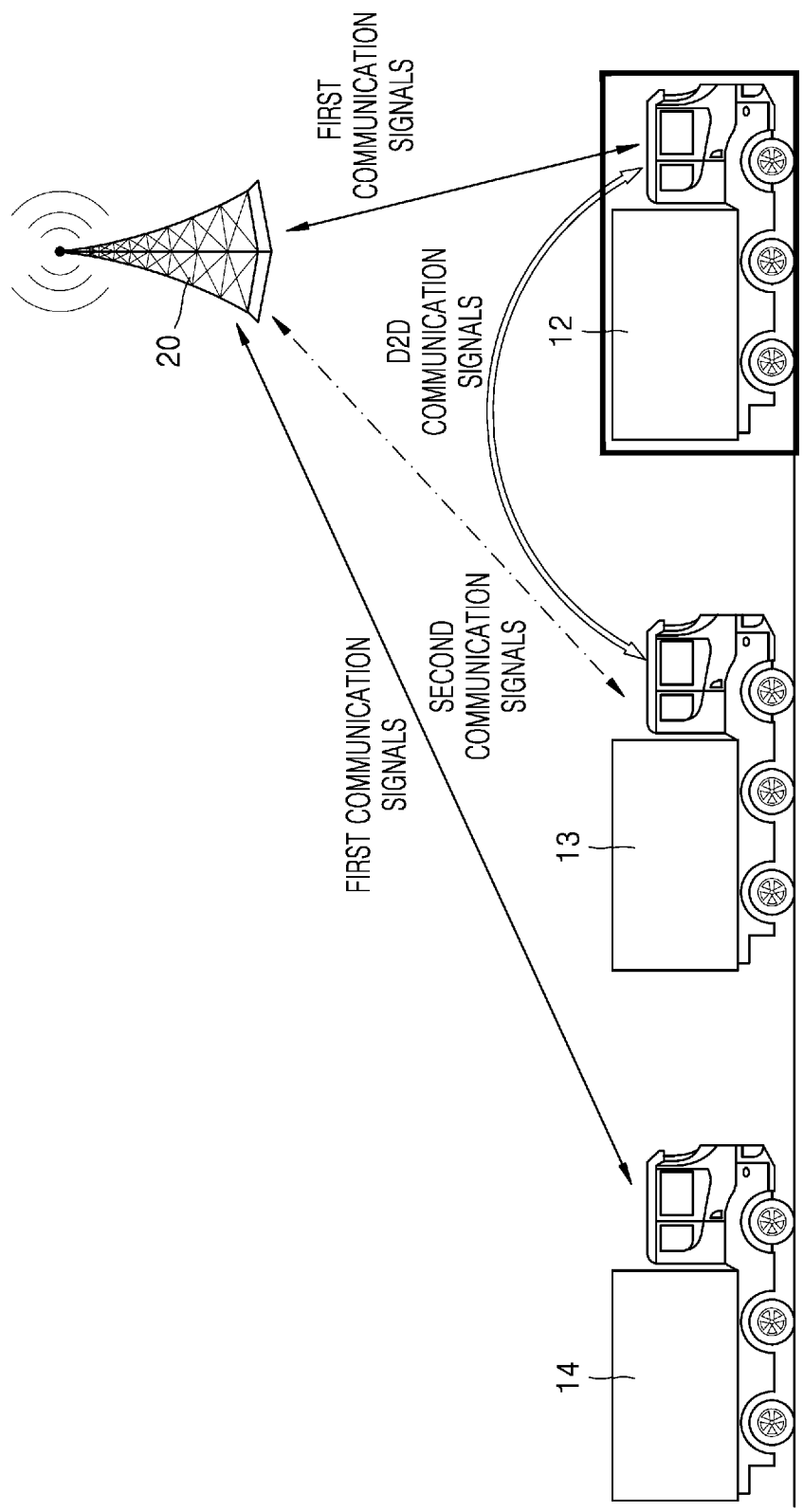
FIG. 10 is a diagram illustrating an example process of performing vehicle-to-vehicle communication according to a device-to-device (D2D) communication method, according to various embodiments.

FIG. 10 is a diagram illustrating an example process of performing vehicle-to-vehicle communication according to a D2D communication method, according to various embodiments.

Referring to FIG. 10, the current vehicle 13 transmits and receives second communication signals to and from the base station 20 according to the second communication method, because there is a possibility of communication interruption with respect to the first communication method. The vehicle 12 in front of the current vehicle 13 and the vehicle 14 behind the vehicle 13 may transmit and receive first communication signals to and from the base station 20 according to the first communication method, because there is no possibility of communication interruption.

When the current vehicle 13 needs to receive a large amount of data, the control module 210 may transmit a request for required data, to the vehicle 12 in front through the D2D communication module 250. In response to the request of the electronic device 200, the vehicle 12 in front may receive, from the base station 20, the data required by the current vehicle 13 using the first communication method, and transmit, to the electronic device 200, the received data according to the D2D communication method.

In an embodiment of the disclosure, the control module 210 may transmit, to the leader vehicle, a message indicating that a large amount of data is required, and receive, from the leader vehicle, information about vehicles that are using the first communication method. Then, the control module 210 may transmit, to at least one of the vehicles that are using the first communication method, a request for required data according to the D2D communication method.

The control module 210 may determine the vehicle to which the request for the required data is to be transmitted using the D2D communication method, in various ways. For example, the control module 210 may transmit the request for the required data, to a vehicle closest to the current vehicle 13 among the vehicles that are using the first communication method.

As another example, the control module 210 may transmit the request for the required data, to a vehicle having the highest signal strength according to the D2D communication method among the vehicles that are using the first communication method.

Figure 11:
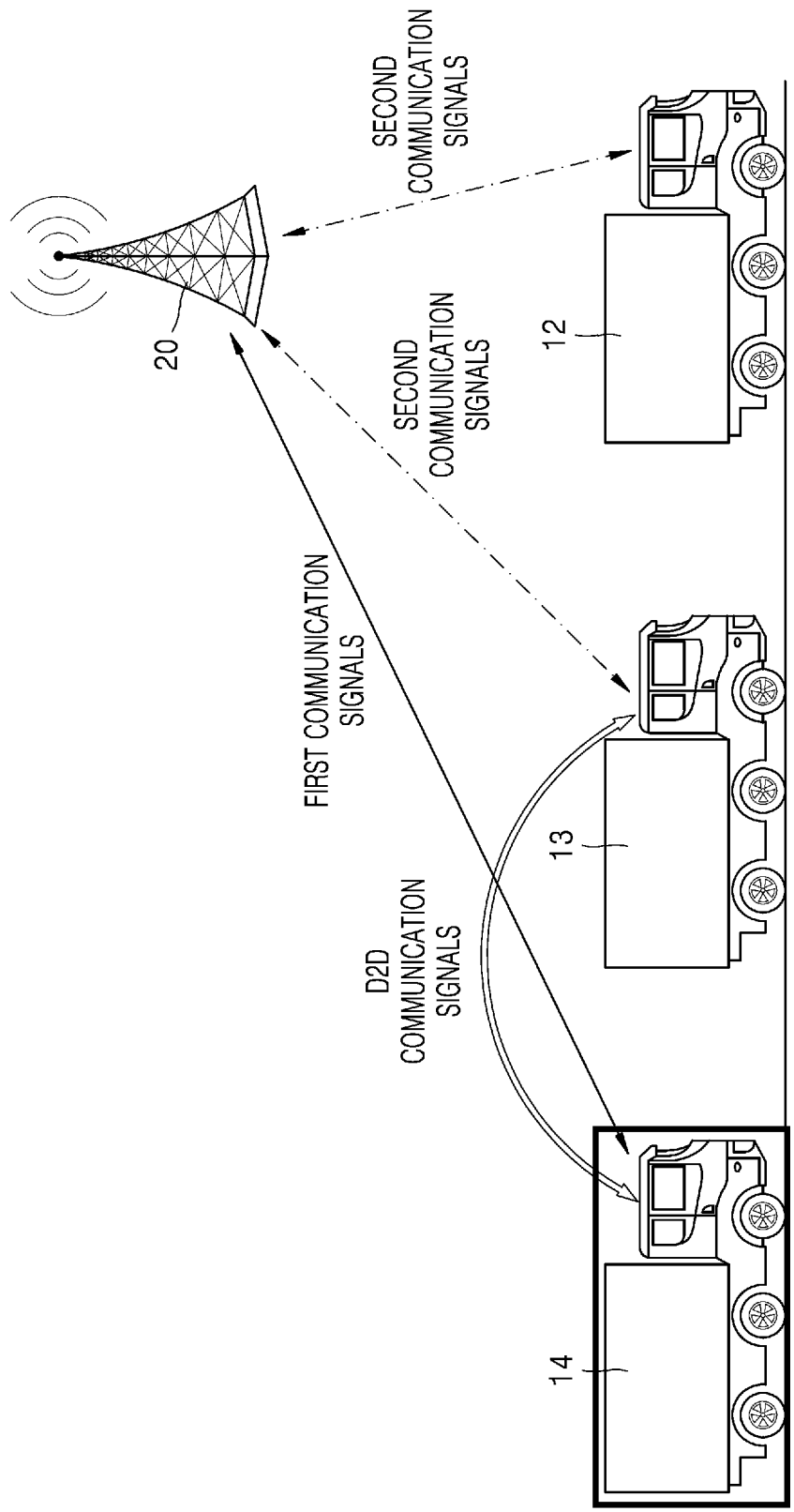
FIG. 11 is a diagram illustrating that subjects of D2D communication may be changed, according to various embodiments.

FIG. 11 is a diagram illustrating that subjects of D2D communication may be changed, according to various embodiments.

Referring to FIG. 11, the vehicle 12 in front that is connected to the electronic device 200 of the current vehicle 13 through D2D communication may switch from the first communication method to the second communication method due to a possibility of communication interruption. In this case, the control module 210 may transmit a request for required data, to another vehicle, for example, the vehicle 14 behind according to the D2D communication method.

In an embodiment of the disclosure, when the vehicle 12 in front switches to the second communication method, the control module 210 may transmit the request for the required data to a vehicle that is closest to the current vehicle 13 among vehicles that are using the first communication method, or to a vehicle having the greatest signal strength according to the D2D communication method. In an embodiment of the disclosure, when the vehicle 12 in front switches to the second communication method, the control module 210 may newly receive, from the leader vehicle, information about vehicles currently using the first communication method, and select a vehicle to which the request for the required data is to be transmitted, from among the vehicles currently using the first communication method.

Figure 12:
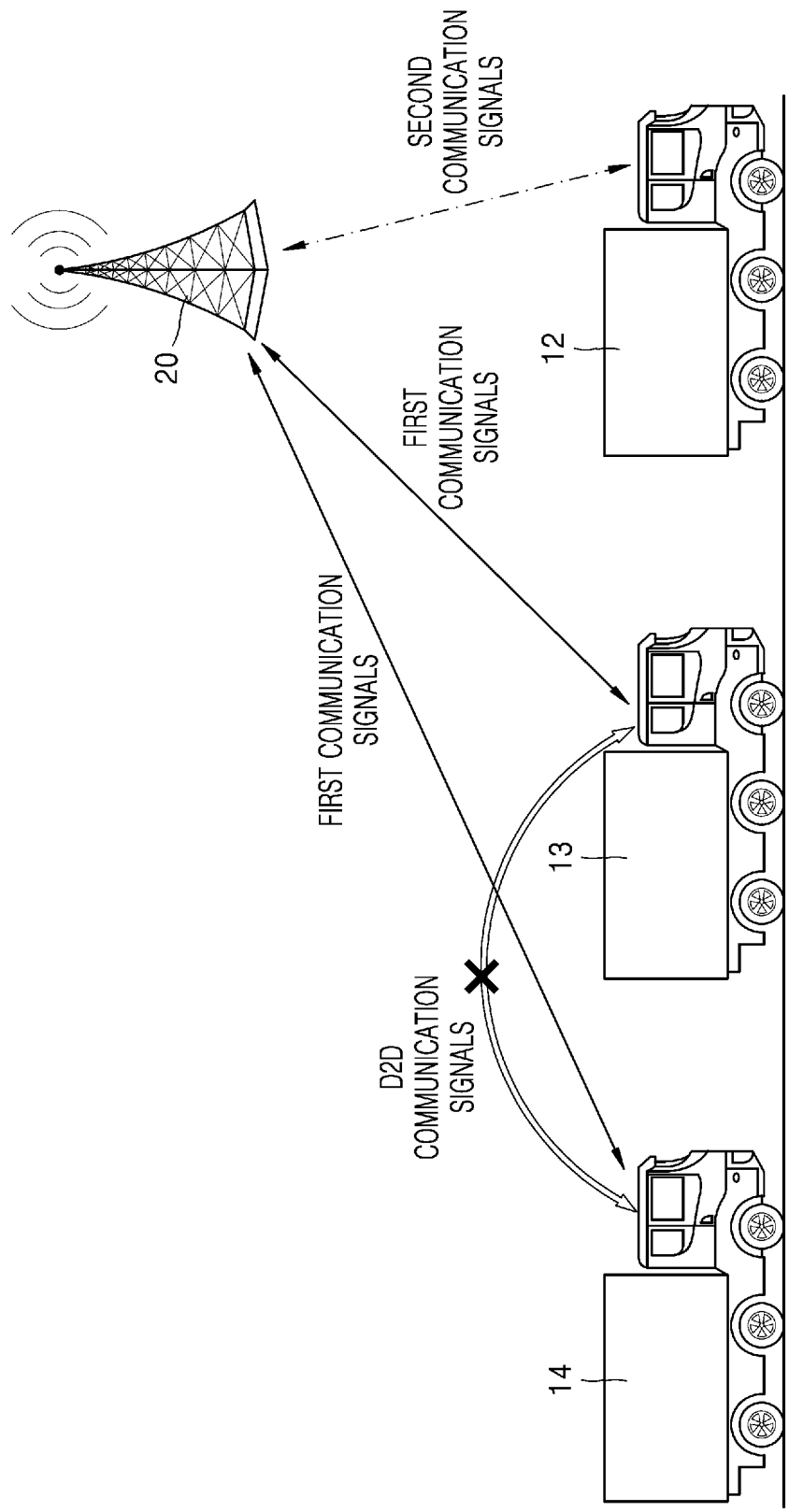
FIG. 12 is a diagram illustrating an example process, performed by an electronic device, of switching to a first communication method and then performing communication when there is no possibility of communication interruption, according to various embodiments.

FIG. 12 is a diagram illustrating an example process, performed by the electronic device 200, of switching to the first communication method and then performing communication when there is no possibility of communication interruption, according to various embodiments.

In an embodiment of the disclosure, when there is no longer a possibility of communication interruption with respect to the first communication method while receiving data using the second communication method and the D2D communication method, the control module 210 may switch from the second communication method to the first communication method and stop communication using the D2D communication method.

A reason for stopping the communication using the D2D communication method is that the first communication method enables fast transmission and reception of a large amount of data and reduces the load continuously applied to the vehicle 14 behind due to the D2D communication.

In an embodiment of the disclosure, when a request for data is received from another vehicle according to D2D communication while performing communication according to the first communication method, the control module 210 may receive the data required by the other vehicle using the first communication method, and transmit the received data to the other vehicle according to the D2D communication.

Figures 13A, 13B:
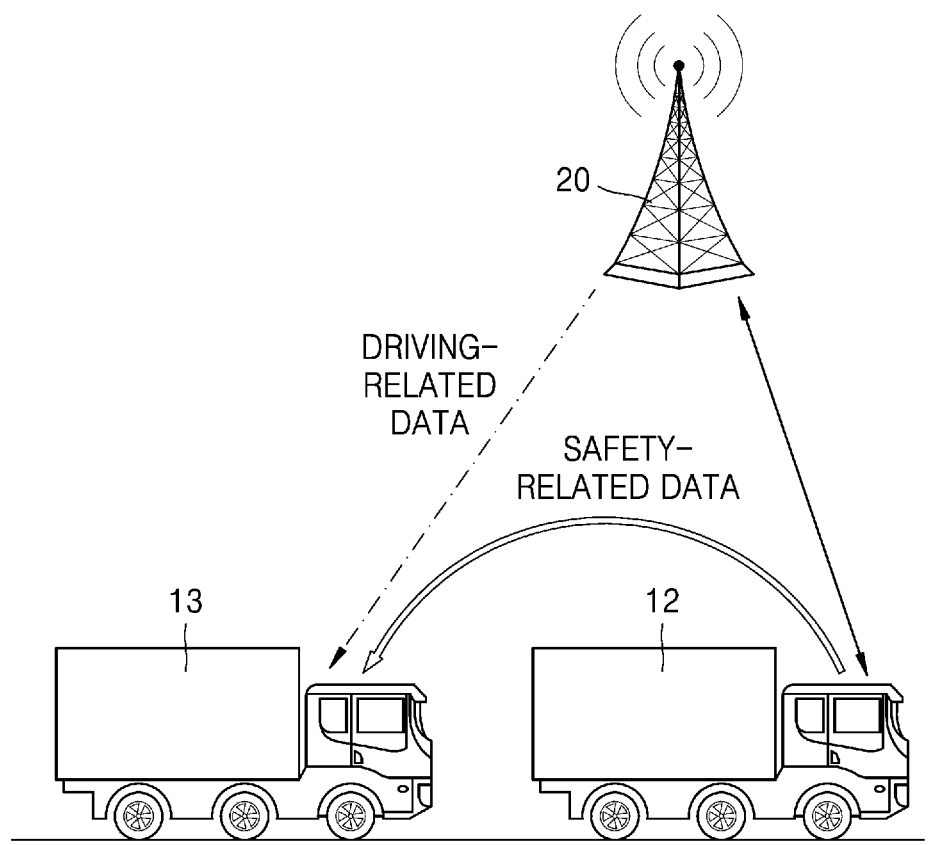
FIG. 13A and FIG. 13B are diagrams illustrating an example method of receiving required data considering the priority of the required data, according various embodiments.

FIG. 13A and FIG. 13B are diagrams illustrating an example method of receiving required data considering the priority of the required data, according to an embodiment of the disclosure.

In an embodiment of the disclosure, when the control module 210 is to receive required data using the second communication method and the D2D communication method, the required data is classified according to the priority, and data having a higher priority may be received using the D2D communication method, and data having a low priority may be received using the second communication method. This is because the D2D communication method is based on the first communication method that enables a faster data transmission/reception speed than does the second communication method.

FIG. 13A is a table showing example priorities according to types of data, and as shown in the table, the priorities may be set such that safety-related data has the first priority, driving-related data has the second priority, and user data has the third priority. The priorities according to the types of data may be variously changed.

The safety-related data may include, for example, data highly related to the possibility of the current vehicle 13 getting into an accident, such as data about surrounding obstacles, data about pedestrians, or data about whether an accident has occurred.

The driving-related data may include, for example, data useful for convenient driving of the current vehicle 13, such as driving route data (or navigation data) or weather data.

The user data is data requested by the driver of the current vehicle 13, and may include, for example, video data, music data, and data regarding a web page accessed by the driver.

Referring to FIG. 13B, when required data includes safety-related data and driving-related data, the control module 210 of the current vehicle 13 may receive the safety-related data from the vehicle 12 in front according to the D2D communication method, and receive the driving-related data according to the second communication method.

Because the control module 210 receives data considering the priority using two different communication methods, it is possible to quickly receive the data and safely drive the current vehicle 13.

Figure 14:
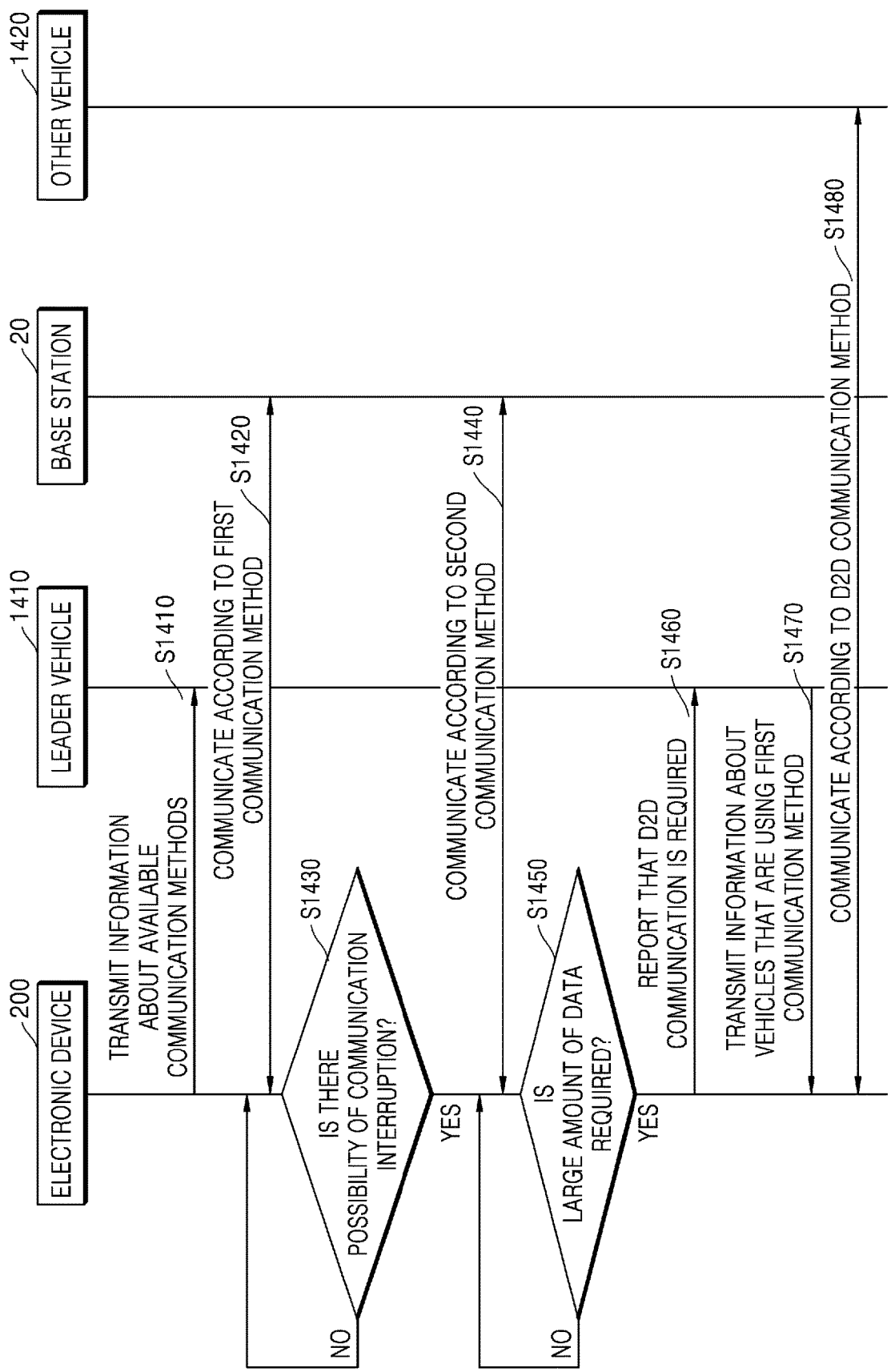
FIG. 14 is a signal flow diagram illustrating an example operation of an electronic device according to various embodiments.

FIG. 14 is a signal flow diagram illustrating an example operation of the electronic device 200 according to various embodiments.

Referring to FIG. 14, in operation S1410, the electronic device 200 of the current vehicle 13 transmits, to a leader vehicle 1410, information about available communication methods, before or after participating in platooning.

The electronic device 200 may transmit the information about the available communication methods to the leader vehicle 1410 using the D2D communication method.

In operation S1420, when the first communication method is available, the electronic device 200 communicates with the base station 20 according to the first communication method. When the first communication method is unavailable and the second communication method is available, the electronic device 200 may communicate with the base station 20 according to the second communication method.

In an embodiment of the disclosure, the electronic device 200 may report, to the leader vehicle 1410, information about the communication method it is using.

In operation S1430, the electronic device 200 determines whether there is a possibility of communication interruption with respect to the first communication method, and when there is no possibility of communication interruption, the electronic device 200 maintains the communication state according to the first communication method.

When there is a possibility of communication interruption, in operation S1440, the electronic device 200 communicates with the base station 20 according to the second communication method instead of the first communication method.

In an embodiment of the disclosure, the electronic device 200 may report, to the leader vehicle 1410, that communication is performed according to the second communication method.

In operation S1450, the electronic device 200 determines whether a large amount of data is required. In an embodiment of the disclosure, the electronic device 200 may determine whether at least a preset amount of data is required.

When a large amount of data is not required, the electronic device 200 maintains the communication state according to the second communication method, and when a large amount of data is required, in operation S1460, the electronic device 200 reports, to the leader vehicle 1410, that D2D communication is required.

In operation S1470, the leader vehicle 1410 transmits, to the electronic device 200, information about vehicles that are using the first communication method.

In operation S1480, the electronic device 200 selects at least one vehicle 1420 from among the vehicles that are using the first communication method, and performs D2D communication with the selected at least one vehicle 1420.

The electronic device 200 may transmit a request for required data to the other vehicle 1420 through D2D communication, and the other vehicle 1420 may transmit, to the electronic device 200, data received from the base station 20.

In an embodiment of the disclosure, when the other vehicle 1420 performing D2D communication with the electronic device 200 switches from the first communication method to the second communication method, the electronic device 200 may receive, from the leader vehicle 1410, information about vehicles that are using the first communication method again, and transmit a request for required data to at least one of the vehicles that are using the first communication method.

In an embodiment of the disclosure, when the reception of the required data is completed and an additional large amount of data is not required, the electronic device 200 may stop the D2D communication with the other vehicle 1420 and communicate with the base station 20 using the second communication method.

Figure 15:
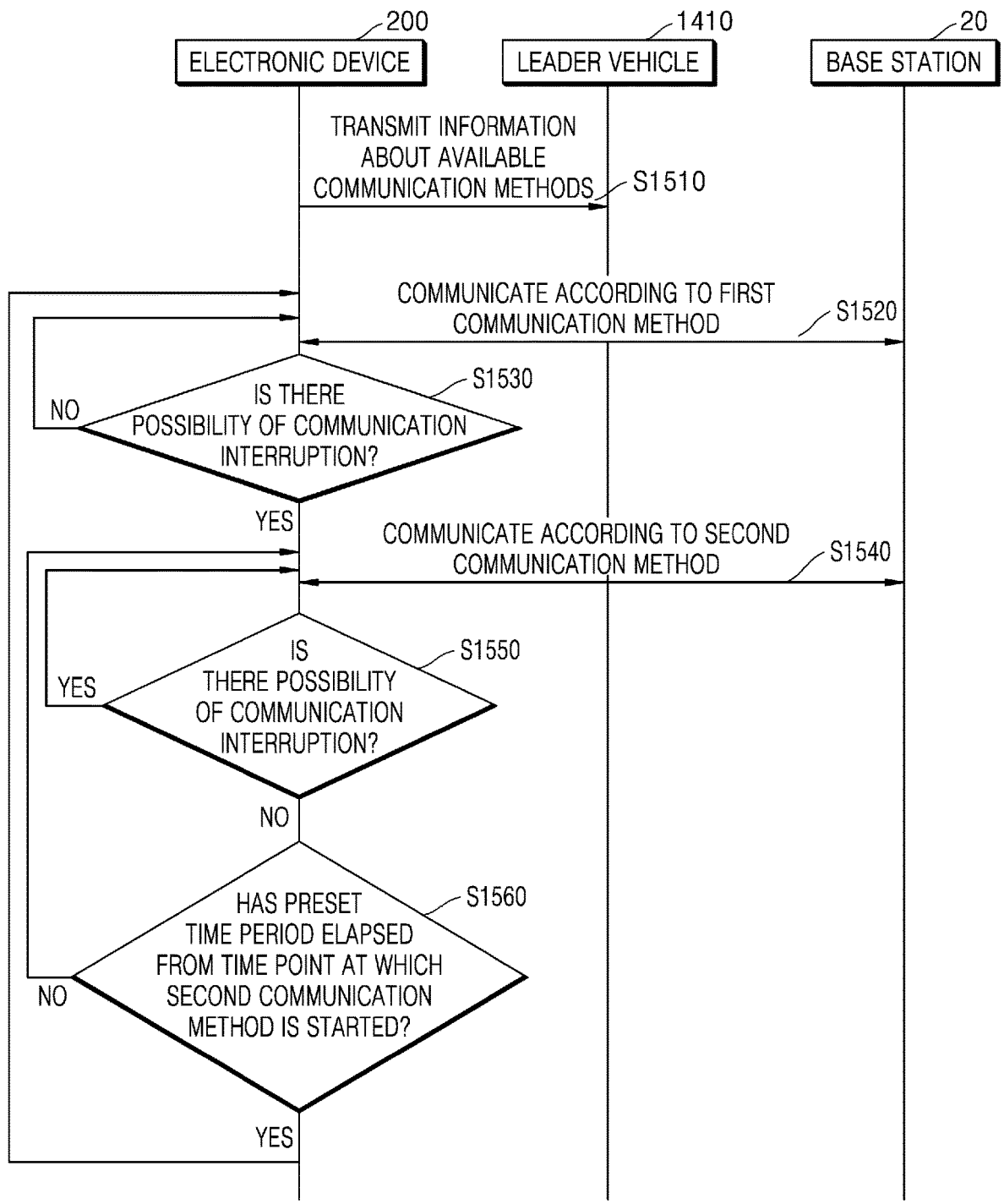
FIG. 15 is a signal flow diagram illustrating an example operation of an electronic device according to various embodiments.

FIG. 15 is a signal flow diagram illustrating an example operation of the electronic device 200 according to various embodiments.

Referring to FIG. 15, in operation S1510, the electronic device 200 of the current vehicle 13 transmits, to the leader vehicle 1410, information about available communication methods, before or after participating in platooning.

The electronic device 200 may transmit the information about the available communication methods to the leader vehicle 1410 using the D2D communication method.

In operation S1520, when the first communication method is available, the electronic device 200 communicates with the base station 20 according to the first communication method. When the first communication method is unavailable and the second communication method is available, the electronic device 200 may communicate with the base station 20 according to the second communication method.

In an embodiment of the disclosure, the electronic device 200 may report, to the leader vehicle 1410, information about the communication method it is using.

In operation S1530, the electronic device 200 determines whether there is a possibility of communication interruption with respect to the first communication method, and when there is no possibility of communication interruption, the electronic device 200 maintains the communication state according to the first communication method.

When there is a possibility of communication interruption, in operation S1540, the electronic device 200 communicates with the base station 20 according to the second communication method instead of the first communication method.

In an embodiment of the disclosure, the electronic device 200 may report, to the leader vehicle 1410, that communication is performed according to the second communication method.

In operation S1550, the electronic device 200 determines again whether there is a possibility of communication interruption with respect to the first communication method.

When there is still the possibility of communication interruption with respect to the first communication method, the electronic device 200 maintains the communication state according to the second communication method, and when there is no possibility of communication interruption with respect to the first communication method, in operation S1560, the electronic device 200 determines whether a preset time period (e.g., 10 minutes) has elapsed from a time point at which the communication according to the second communication method is started. The time period may be preset for the electronic device 200.

The determining of whether the preset time period has elapsed from the time point at which the communication according to the second communication method is started is to reduce communication interruption that may occur due to frequent changes in communication method or the load applied to the electronic device 200.

In operation S1540, when the preset time period has not elapsed from the time point at which the communication according to the second communication method is started, the electronic device 200 maintains the communication state according to the second communication method, and when the preset time period has elapsed from the time point at which the communication according to the second communication method is started, the electronic device 200 may switch to the first communication method and then communicate with the base station 20.

In an embodiment of the disclosure, at least one of operations performed by the control module 210, the mobile communication module 230, and the D2D communication module 250 may be performed using an artificial intelligence (AI) technology. Hereinafter, the operations performed using AI technology are described in greater detail with reference to FIG. 16.

Figure 16:
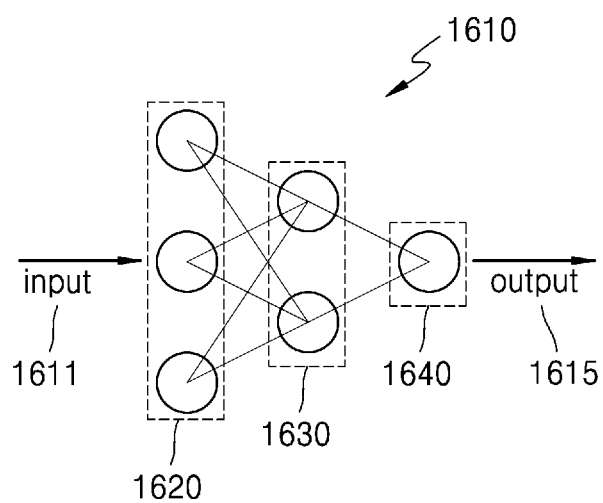
FIG. 16 is a diagram illustrating an example operation performed using artificial intelligence technology, according to various embodiments.

FIG. 16 is a diagram illustrating an example operation performed using AI technology, according to various embodiments.

In detail, using the AI technology for performing computations through a neural network, the electronic device 200 may perform at least one of i) determining whether there is a possibility of communication interruption, ii) selecting, from among various communication methods, a communication method to be used for transmitting and receiving data, iii) determining data to be received through D2D communication and data to be received through communication according to the second communication method, or iv) selecting a vehicle with which D2D communication is to be performed (hereinafter, referred to as the operation of the electronic device 200). For example, the at least one operation may be performed using the AI technology, based on a communication state between a server (not shown) and a vehicle.

The AI technology is for obtaining an intended result by performing processing, such as analysis and/or classification, on input data based on computations through a neural network.

The AI technology may be implemented using algorithms. Here, an algorithm or a set of algorithms for implementing AI technology may include a neural network. The neural network may receive an input of data, perform computations for analysis and classification, and output resulting data. In order for the neural network to accurately output resulting data corresponding to input data, it is necessary to train the neural network. Here, 'training' may refer to training the neural network to discover or learn by itself a method of analyzing pieces of input data to the neural network, a method of classifying the pieces of input data, and/or a method of extracting features required for generating resultant data from the pieces of input data. In detail, through a training process, the neural network may be trained based on training data to optimize weight values (or parameters) in the neural network. Then, by processing input data through the neural network having the optimized weight values, an intended result is output.

Neural networks that include a plurality of hidden layers for performing computations, e.g., the depth of which for performing computations is high, may be classified as deep neural networks. Examples of neural networks include deep neural networks (DNNs), convolutional neural networks (CNNs), recurrent neural networks (RNNs), restricted Boltzmann machines (RBMs), deep belief networks (DBNs), bidirectional recurrent DNNs (BRDNNs), and deep Q-networks, but are not limited thereto. In addition, the neural networks may be subdivided. For example, CNNs may be subdivided into deep CNN (DCNN), capsule neural networks (CapsNets) (not shown), and the like.

An 'AI model' may refer to a neural network including at least one layer operating to receive input data and output an intended result. The 'AI model' may also refer to an algorithm or a set of a plurality of algorithms for outputting an intended result by performing computations through a neural network, a processor for executing the algorithm (or the set of algorithms), software for executing the algorithm (or the set of algorithms), or hardware for executing the algorithm (or the set of algorithms).

Referring to FIG. 16, a neural network 1610 may be trained by receiving training data. The trained neural network 1610 receives, through an input layer 1620, input data 1611 (e.g., vehicle-related information (e.g., the speed of the vehicle or the load on an ECU in the vehicle), information about surroundings of the vehicle, or information related to networks available at the current position of the vehicle (e.g., type of network or available bandwidth, quality of signals transmitted and received in the bandwidth)), and the input layer 1620, a hidden layer 1630, and an output layer 1640 may analyze the input data 1611 or data transferred from the respective previous layers and thus perform computations to output output data 1615.

Although FIG. 16 illustrates one hidden layer 1630, this is only an example, and a plurality of hidden layers 1630 may be provided.

For example, the neural network 1610 may learn a method of determining whether there is a possibility of communication interruption, based on vehicle-related information and/or information about surroundings of a vehicle. The trained neural network 1610 may receive vehicle-related information and/or information about surroundings of a vehicle, and determine whether there is a possibility of communication interruption with respect to the first communication method.

As another example, the neural network 1610 may learn at least one of a method of selecting, from among vehicles using the first communication method, a vehicle to which a request for required data is to be transmitted through D2D communication, or a method of determining, from among required data, data to be received through D2D communication and data to be received through communication according to the second communication method.

In an embodiment of the disclosure, a neural network that performs an operation of the electronic device 200 may be implemented in a control module (e.g., 210 of FIG. 2).

The neural network that performs the above-described operation of the electronic device 200 may be implemented in an electronic device (not shown) or a processor (not shown) separate from the electronic device 200.

Computations through the neural network described above may be performed by a server (not shown) capable of communicating with the electronic device 200 according to an embodiment of the disclosure through a wireless communication network. Hereinafter, communication between the electronic device 200 and the server (not shown) is described in greater detail with reference to FIGS. 17 and 18.

Figure 17:
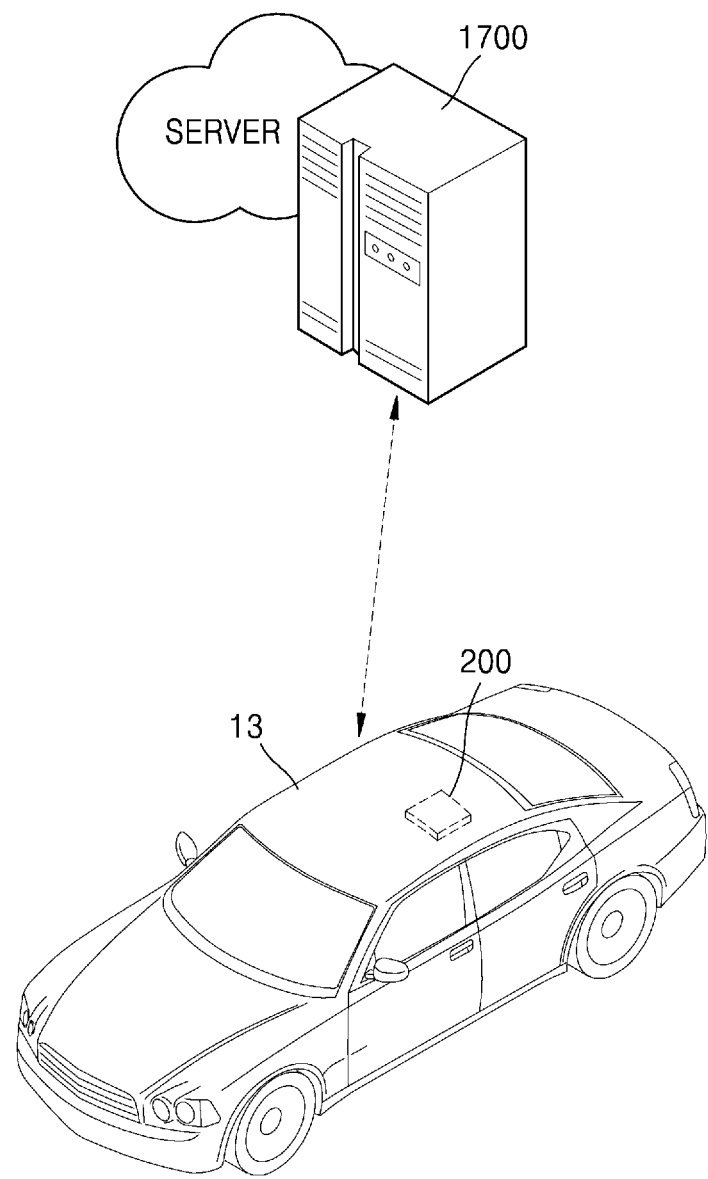
FIG. 17 is a diagram illustrating an electronic device mounted on a vehicle, and a server, according to various embodiments.

FIG. 17 is a diagram illustrating the electronic device 200 mounted on the vehicle 13, and a server 1700, according to various embodiments.

In an embodiment of the disclosure, the server 1700 may perform at least one of i) determining whether there is a possibility of communication interruption, ii) selecting, from among various communication methods, a communication method to be used for transmitting and receiving data, iii) determining data to be received through D2D communication and data to be received through communication according to the second communication method, or iv) selecting a vehicle with which D2D communication is to be performed, and a result thereof may be transmitted to the electronic device 200 in the vehicle 13.

The server 1700 may transmit and receive data to and from the electronic device 200 through a communication network and process the data.

In an embodiment of the disclosure, a separate electronic device mounted on the vehicle may receive, from the server 1700, a result of at least one of i) determining whether there is a possibility of communication interruption, ii) selecting, from among various communication methods, a communication method to be used for transmitting and receiving data, iii) determining data to be received through D2D communication and data to be received through communication according to the second communication method, or iv) selecting a vehicle with which D2D communication is to be performed, and transmit the received result to the electronic device 200. In this case, the electronic device 200 may operate according to the received result.

The server 1700 may include, for example, and without limitation, a server, a server system, a server-based device, or the like, which transmits and receives data to and from the electronic device 200 through a communication network and processes the data.

Figure 18:
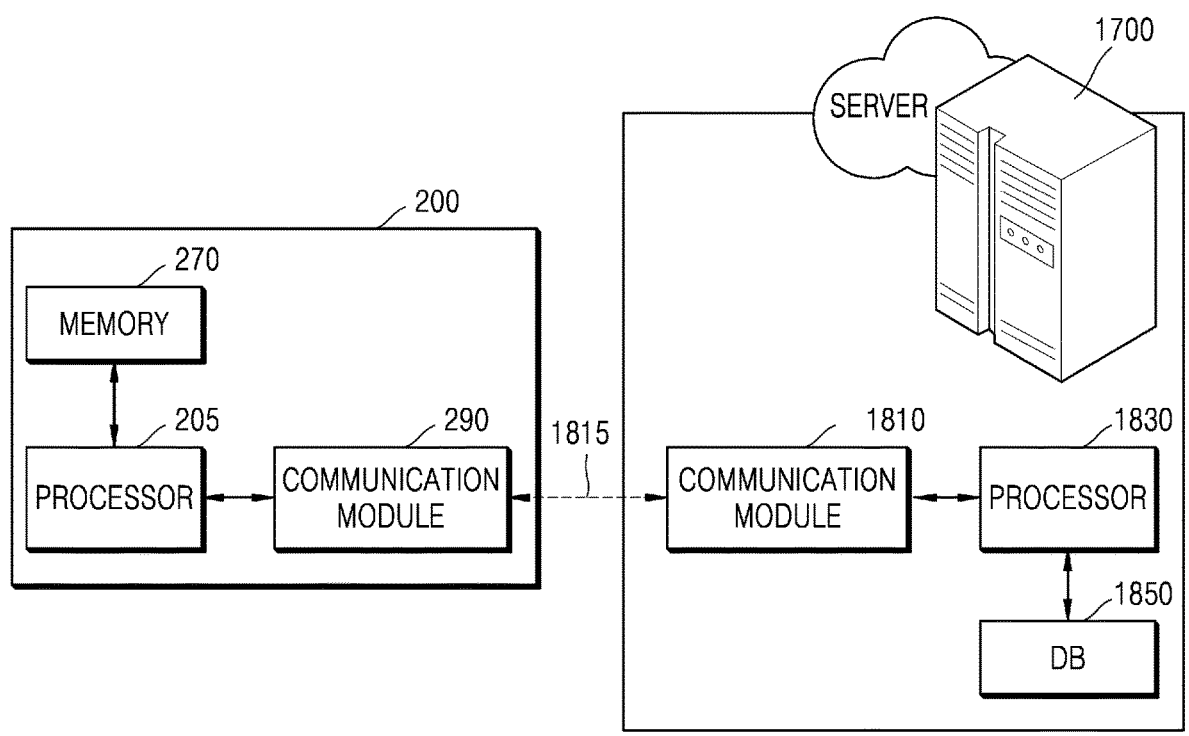
FIG. 18 is a diagram illustrating a server and an electronic device that operates in conjunction with the server according to various embodiments.

Referring to FIG. 18, the server 1700 includes a communication module (e.g., including communication circuitry) 1810 configured to communicate with the electronic device 200, and a processor (e.g., including processing circuitry) 1830 configured to perform at least one instruction.

For example, the processor 1830 of the server 1700 may receive information related to the vehicle 13 and/or information about surroundings of the vehicle 13, and determine whether there is a possibility of communication interruption. The communication module 1810 may transmit, to the electronic device 200, information indicating whether there is a possibility of communication interruption.

As another example, the processor 1830 of the server 1700 may determine, from among several vehicles, a vehicle to which a request for data is to be transmitted through D2D communication. The communication module 1810 may transmit, to the electronic device 200, information about the vehicle to which the request for the required data is to be transmitted.

In an embodiment of the disclosure, the server 1700 may perform the operation of the electronic device 200 by performing computations through the neural network 1610 described above with reference to FIG. 16. In detail, the server 1700 may train an AI model and store the trained AI model. In addition, the server 1700 may perform the above-described operation of the electronic device 200 using the trained AI model.

In general, the electronic device 200 may have limited memory capacity, computation processing speed, and training data set collection capability compared to the server 1700. Therefore, an operation requiring a large data storage and a large computation amount may be performed by the server 1700, and then required data and AI model may be transmitted to the electronic device 200 through a communication network. Then, the electronic device 200 may rapidly and easily perform a required operation without a large-capacity memory and a high-speed processor, by receiving and using the required data and AI model from the server 1700.

In an embodiment of the disclosure, the server 1700 may include the neural network 1610 described above with reference to FIG. 16. For example, the neural network 1610 included in the server 1700 may perform computations for the above-described operation of the electronic device 200.

A communication module 290 of the electronic device 200 (e.g., the mobile communication module 230 or the D2D communication module 250 illustrated in FIG. 2) may include various communication circuitry and communicates with an external device through a wireless communication network 1815. The external device may include the server 1700 capable of performing at least one of computations required by the electronic device 200 or transmitting data required by the electronic device 200.

The communication module 290 includes at least one communication module, such as a short-range communication module, a wired communication module, a mobile communication module, or a broadcast receiving module. The communication module 290 includes a communication module capable of performing transmission and reception of data through a tuner for receiving broadcast, or a network conforming to a communication standard, such as Bluetooth, wireless local area network (WLAN) (e.g., Wi-Fi), wireless broadband (WiBro), World Interoperability for Microwave Access (WiMax), code-division multiple access (CDMA), wideband CDMA (WCDMA), Internet, 3G, 4G, 5G, and/or communication schemes using millimeter waves (mmWAVE).

For example, when the communication module 290 performs communication using millimeter waves (mmWAVE), a large amount of data may be quickly transmitted and received. In detail, the vehicle 13 may improve its safety and/or user convenience by quickly receiving a large amount of data using millimeter waves, and quickly providing data required for the safety of the vehicle 13 (e.g., data required for autonomous driving or data required for a navigation service), content for users (e.g., movies or music), and the like.

The communication module 290 may communicate with another device (e.g., the server 1700) at a remote location through a communication network conforming to a communication standard, such as 3G, 4G, and/or 5G. Here, the communication module 290 that communicates with another device at a remote location may be referred to as a 'long-range communication module'.

The communication module 1810 of the server 1700 may include one or more components that enable communication with the electronic device 200. The detailed configuration of the communication module 1810 corresponds to the above-described configuration of the communication module 290, and thus, a detailed description thereof may not be repeated.

For example, the communication module 1810 may perform communication with another device (e.g., the electronic device 200) at a remote location through a communication network conforming to a communication standard, such as the Internet, 3G, 4G, and/or 5G.

The processor 1830 may include various processing circuitry and controls the overall operation of the server 1700. For example, the processor 1830 may perform required operations by executing at least one of at least one instruction or programs of the server 1700.

A database (DB) 1850 may include a memory (not shown), and may store, in the memory (not shown), at least one of at least one instruction, a program, or data required for the server 1700 to perform a certain operation. Also, the DB 1850 may store data required for the server 1700 to perform computations according to a neural network.

In an embodiment of the disclosure, the server 1700 may store the neural network 1610 described above with reference to FIG. 16. The neural network 1610 may be stored in at least one of the processor 1830 or the DB 1850. The neural network 1610 stored in the server 1700 may be a completely trained neural network.

In an embodiment of the disclosure, the server 1700 may perform the above-described operation of the electronic device 200 using a neural network included therein, and transmit resulting derived data to the communication module 290 of the electronic device 200 through the communication module 1810.

The server 1700 may transmit the trained neural network to the communication module 290 of the electronic device 200 through the communication module 1810. Then, the electronic device 200 may obtain and store the trained neural network, and obtain intended output data through the neural network.

Figure 19:
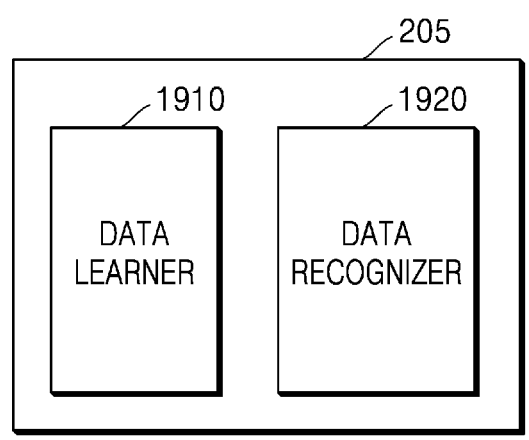
FIG. 19 is a block diagram illustrating an example configuration of a processor included in an electronic device according to various embodiments.

FIG. 19 is a block diagram illustrating an example configuration of a processor 205 included in the electronic device 200 according to various embodiments.

Referring to FIG. 19, the processor (e.g., including processing circuitry) 205 according to an embodiment of the disclosure may include a data learner 1910 and a data recognizer 1920, each of which may include various processing circuitry and/or executable program instructions.

The data learner 1910 may learn a criterion for an operation of the electronic device 200.

For example, the data learner 1910 may learn a criterion regarding which data to use for the operation of the electronic device 200 and how to perform the operation of the electronic device 200 using the data.

The data learner 1910 may learn the criterion for the operation of the electronic device 200 by obtaining data to be used for learning and apply the obtained data to a data recognition model to be described below.

The data recognizer 1920 may perform the operation of the electronic device 200 based on at least one of information related to the vehicle 13, information about surroundings of the vehicle 13, or information related to a network available at the current position of the vehicle 13.

A result value output by the data recognition model may be used to update the data recognition model.

At least one of the data learner 1910 or the data recognizer 1920 may be manufactured in the form of at least one hardware chip and mounted on the electronic device 200. For example, at least one of the data learner 1910 or the data recognizer 1920 may be manufactured in the form of a dedicated hardware chip for AI, or may be manufactured as a part of an existing general-purpose processor (e.g., a central processing unit (CPU) or an application processor) or a dedicated graphics processor (e.g., a graphics processing unit (GPU)) and mounted on the electronic device 200.

The data learner 1910 and the data recognizer 1920 may be mounted on one electronic device 200 or may be mounted on separate devices, respectively. For example, one of the data learner 1910 and the data recognizer 1920 may be included in the electronic device 200, and the other may be included in the server 1700. In addition, model data constructed by the data learner 1910 may be provided to the data recognizer 1920, and data input to the data recognizer 1920 may be provided, as additional training data, to the data learner 1910, by wire or wirelessly.

At least one of the data learner 1910 or the data recognizer 1920 may be implemented as a software module. In a case in which at least one of the data learner 1910 or the data recognizer 1920 is implemented as a software module (or a program module including instructions), the software module may be stored in a non-transitory computer-readable recording medium. In this case, the at least one software module may be provided by an operating system (OS) or a certain application. Alternatively, a part of the at least one software module may be provided by an OS, and the other part may be provided by a certain application.

Figure 20:
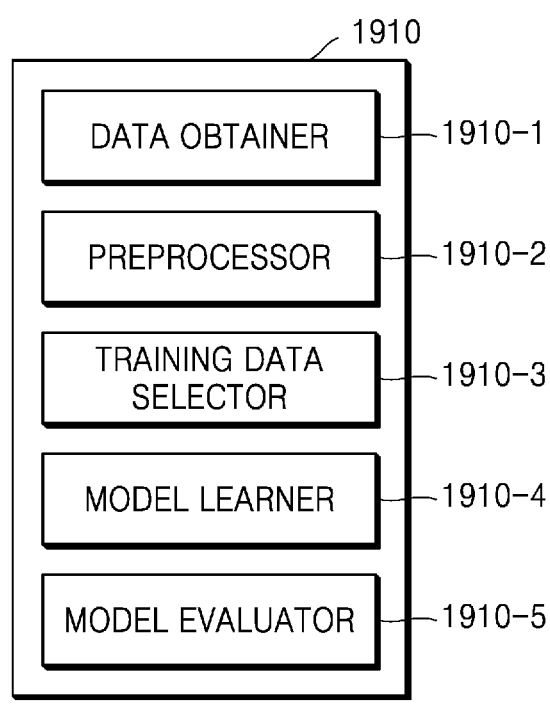
FIG. 20 is a block diagram illustrating an example configuration of a data learner according to various embodiments.

FIG. 20 is a block diagram illustrating an example configuration of the data learner 1910 according to various embodiments.

Referring to FIG. 20, the data learner 1910 according to the embodiment of the disclosure may include a data obtainer 1910-1, a preprocessor 1910-2, a training data selector 1910-3, a model learner 1910-4, and a model evaluator 1910-5, each of which may include various processing circuitry and/or executable program instructions.

The data obtainer 1910-1 may obtain data necessary for the operation of the electronic device 200.

The data obtainer 1910-1 may obtain data necessary for learning the operation of the electronic device 200.

The preprocessor 1910-2 may preprocess the data obtained for learning. The preprocessor 1910-2 may process the data into a predefined format such that the model learner 1910-4, which is described below, uses the data to learn the operation of the electronic device 200.

The training data selector 1910-3 may select data necessary for learning from among the preprocessed data. The selected data may be provided to the model learner 1910-4. The training data selector 1910-3 may select the data necessary for learning from among the preprocessed data according to a predefined criterion for the operation of the electronic device 200. Also, the training data selector 1910-3 may select the data according to a criterion predefined based on learning by the model learner 1910-4, which is described below.

The model learner 1910-4 may learn a criterion regarding how to perform the operation of the electronic device 200. Also, the model learner 1910-4 may learn a criterion regarding which training data to be used for the operation of the electronic device 200.

In addition, the model learner 1910-4 may train a data recognition model used for the operation of the electronic device 200, using training data. In this case, the data recognition model may be a model that is pre-established. For example, the data recognition model may be a model that is pre-established by receiving basic training data (e.g., sample data).

The data recognition model may be established considering a field to which the recognition model is applied, the purpose of learning, the computing performance of a device, or the like. The data recognition model may be, for example, a model based on a neural network. For example, the data recognition model may be based on a CNN, a DNN, an RNN, or a BRDNN, but is not limited thereto.

According to an embodiment of the disclosure, in a case in which a plurality of pre-established data recognition models are provided, the model learner 1910-4 may select, as the data recognition model to be trained, a data recognition model having input training data that is most relevant to the basic training data. In this case, the basic training data may be pre-classified according to types of data, and the plurality of data recognition models may be pre-established for the respective types of data. For example, the basic training data may be pre-classified according to various standards, such as the area where the training data is generated, the time point at which the training data is generated, the size of the training data, the genre of the training data, the generator of the training data, or the type of an object in the training data.

The model learner 1910-4 may train the data recognition model using a training algorithm including, for example, error back-propagation or gradient descent.

The model learner 1910-4 may train the data recognition model through supervised learning using, for example, training data as an input value. In addition, for example, the model learner 1910-4 may train the data recognition model through unsupervised learning for finding a criterion for performing the operation of the electronic device 200 by self-learning the type of data required for the operation of the electronic device 200 without supervision. Also, the model learner 1910-4 may train the data recognition model through, for example, reinforcement learning.

When the data recognition model is trained, the model learner unit 1910-4 may store the trained data recognition model. In this case, the model learner 1910-4 may store the trained data recognition model in the memory 270 of the electronic device 200 including the data recognizer 1920. The model learner 1910-4 may store the trained data recognition model in a memory of the server 1700 connected to the electronic device 200 through a wired or wireless network.

In this case, the memory in which the trained data recognition model is stored may also store, for example, a command or data related to at least one other component of the electronic device 200. The memory may also store software and/or programs. The programs may include, for example, a kernel, middleware, an application programming interface (API) and/or an application program (or "application").

The model evaluator 1910-5 may input evaluation data to the data recognition model, and allow the model learner 1910-4 to re-train the data recognition model when a recognition result output on the evaluation data does not satisfy a predefined criterion. In this case, the evaluation data may be predefined data for evaluating the data recognition model.

For example, in a case in which the number or ratio of incorrect recognition results among recognition results output by the trained data recognition model for the evaluation data is greater than a predefined threshold value, it may be evaluated that the predefined criterion is not satisfied. For example, in a case in which the predefined criterion is 2% and the data recognition model outputs incorrect recognition results for more than 20 pieces of evaluation data among a total of 1000 pieces of evaluation data, the model evaluator 1910-5 may evaluate that the data recognition model is not suitable.

In a case in which a plurality of trained data recognition models are provided, the model evaluator 1910-5 may evaluate whether each of the trained data recognition models satisfies the predefined criterion, and select, as a final data recognition model, a model that satisfies the predefined criterion. In this case, in a case in which a plurality of models satisfy the predefined criterion, the model evaluator 1910-5 may select, as final data recognition models, any one model or a preset number of models in a descending order of evaluation scores.

At least one of the data obtainer 1910-1, the preprocessor 1910-2, the training data selector 1910-3, the model learner 1910-4, or the model evaluator 1910-5 in the data learner 1910 may be manufactured as at least one hardware chip and mounted on the electronic device 200. For example, at least one of the data obtainer 1910-1, the preprocessor 1910-2, the training data selector 1910-3, the model learner 1910-4, or the model evaluator 1910-5 may be manufactured in the form of a dedicated hardware chip for AI, or may be manufactured as a part of an existing general-purpose processor (e.g., a CPU or an application processor) or a dedicated graphics processor (e.g., a GPU) and mounted on the electronic device 200.

The data obtainer 1910-1, the preprocessor 1910-2, the training data selector 1910-3, the model learner 1910-4, and the model evaluator 1910-5 may be mounted on one electronic device 200, or may be separately mounted on electronic devices. For example, some of the data obtainer 1910-1, the preprocessor 1910-2, the training data selector 1910-3, the model learner 1910-4, and the model evaluator 1910-5 may be included in the electronic device 200, and the other may be included in the server 1700.

At least one of the data obtainer 1910-1, the preprocessor 1910-2, the training data selector 1910-3, the model learner 1910-4, or the model evaluator 1910-5 may be implemented as a software module. In a case in which at least one of the data obtainer 1910-1, the preprocessor 1910-2, the training data selector 1910-3, the model learner 1910-4, or the model evaluator 1910-5 is implemented as a software module (or a program module including instructions), the software module may be stored in a non-transitory computer-readable medium. In addition, in this case, the at least one software module may be provided by an OS or a certain application. Alternatively, a part of the at least one software module may be provided by an OS, and the other part may be provided by a certain application.

Figure 21:
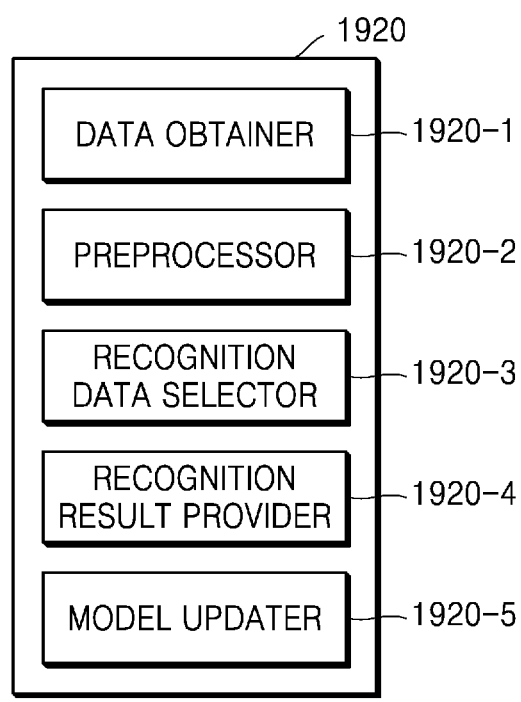
FIG. 21 is a block diagram illustrating an example configuration of a data recognizer according to various embodiments.

FIG. 21 is a block diagram illustrating an example configuration of the data recognizer 1920 according to various embodiments.

Referring to FIG. 21, the data recognizer 1920 according to the embodiment of the disclosure may include a data obtainer 1920-1, a preprocessor 1920-2, a recognition data selector 1920-3, a recognition result provider 1920-4, and a model updater 1920-5, each of which may include various processing circuitry and/or executable program instructions.

The data obtainer 1920-1 may obtain data necessary for the operation of the electronic device 200, and the preprocessor 1920-2 may preprocess the obtained data. The preprocessor 1920-2 may process the obtained data into a predefined format such that the recognition result provider 1920-4, which is described below, uses the data for the operation of the electronic device 200.

The recognition data selector 1920-3 may select data necessary for the operation of the electronic device 200 from among the preprocessed data. The selected data may be provided to the recognition result provider 1920-4. Also, the recognition data selector 1920-3 may select data according to a criterion predefined based on learning by the model learner 1910-4.

The recognition result provider 1920-4 may apply the selected data to a data recognition model to perform the operation of the electronic device 200. The recognition result provider 1920-4 may provide a recognition result according to a recognition purpose for the data. The recognition result provider 1920-4 may apply the selected data to the data recognition model using the data selected by the recognition data selector 1920-3 as an input value. In addition, the recognition result may be determined by the data recognition model.

The model updater 1920-5 may refine the data recognition model based on evaluation of the recognition result provided by the recognition result provider 1920-4. For example, the model updater 1920-5 may provide the recognition result provided by the recognition result provider 1920-4, to the model learner 1910-4 such that the model learner 1910-4 refines the data recognition model.

At least one of the data obtainer 1920-1, the preprocessor 1920-2, the recognition data selector 1920-3, the recognition result provider 1920-4, or the model updater 1920-5 in the data recognizer 1920 may be manufactured as at least one hardware chip and mounted on the electronic device 200. For example, at least one of the data obtainer 1920-1, the preprocessor 1920-2, the recognition data selector 1920-3, the recognition result provider 1920-4, or the model updater 1920-5 may be manufactured in the form of a dedicated hardware chip for AI, or may be manufactured as a part of an existing general-purpose processor (e.g., a CPU or an application processor) or a dedicated graphics processor (e.g., a GPU) and mounted on the electronic device 200.

The data obtainer 1920-1, the preprocessor 1920-2, the recognition data selector, the recognition result provider 1920-4, and the model updater 1920-5 may be mounted on one electronic device 200, or may be separately mounted on electronic devices. For example, some of the data obtainer 1920-1, the preprocessor 1920-2, the recognition data selector, the recognition result provider 1920-4, and the model updater 1920-5 may be included in the electronic device 200, and the other may be included in the server 1700.

At least one of the data obtainer 1920-1, the preprocessor 1920-2, the recognition data selector, the recognition result provider 1920-4, or the model updater 1920-5 may be implemented as a software module. In a case in which at least one of the data obtainer 1920-1, the preprocessor 1920-2, the recognition data selector, the recognition result provider 1920-4, or the model updater 1920-5 is implemented as a software module (or a program module including instructions), the software module may be stored in a non-transitory computer-readable medium. In addition, in this case, the at least one software module may be provided by an OS or a certain application. Alternatively, a part of the at least one software module may be provided by an OS, and the other part may be provided by a certain application.

Figure 22:
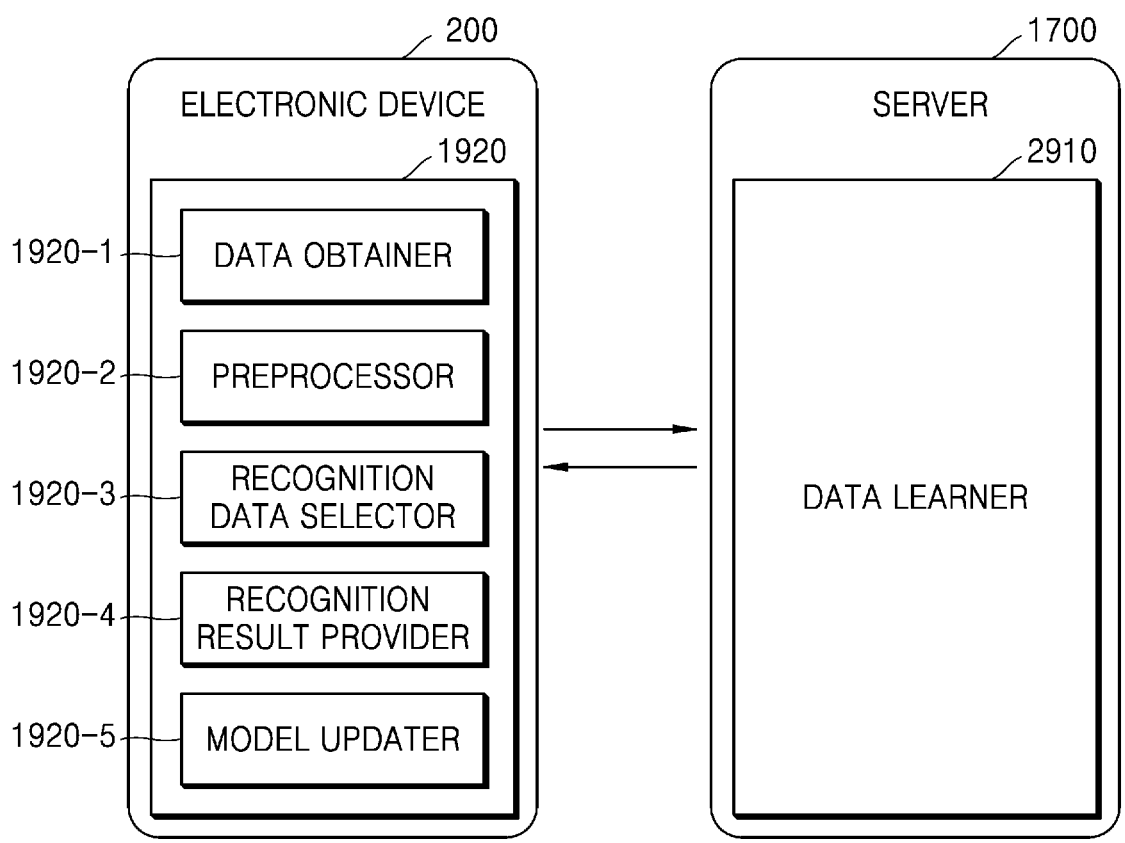
FIG. 22 is a diagram illustrating an example in which an electronic device and a server operate in conjunction with each other to learn and recognize data, according to various embodiments.

FIG. 22 is a diagram illustrating an example in which the electronic device 200 and the server 1700 operate in conjunction with each other to learn and recognize data, according to various embodiments.

Referring to FIG. 22, the server 1700 may learn a criterion for the operation of the electronic device 200, and the electronic device 200 may perform its operation based on a result of the learning by the server 1700.

In this case, a data learner 2910 of the server 1700 may perform the function of the data learner 1910 illustrated in FIG. 20. The data learner 2910 of the server 1700 may learn a criterion regarding which data to use in order to determine a certain situation. Also, the data learner 2910 may learn a criterion for the operation of the electronic device 200 using the data. The data learner 2910 may learn the criterion for the operation of the electronic device 200 by obtaining data to be used for learning and apply the obtained data to a data recognition model.

The recognition result provider 1920-4 of the electronic device 200 may apply data selected by the recognition data selector 1920-3 to the data recognition model generated by the server 1700 so as to perform the operation of the electronic device 200. For example, the recognition result provider 1920-4 may transmit, to the server 1700, the data selected by the recognition data selector 1920-3, and request the server 1700 to perform the operation of the electronic device 200 by applying the data selected by the recognition data selector 1920-3 to the recognition model. Also, the recognition result provider 1920-4 may receive, from the server 1700, information about a result of the operation performed by the server 1700.

The recognition result provider 1920-4 of the electronic device 200 may receive, from the server 1700, the recognition model generated by the server 1700, and perform the operation of the electronic device 200 using the received recognition model. In this case, the recognition result provider 1920-4 of the electronic device 200 may apply the data selected by the recognition data selector 1920-3 to the data recognition model received from the server 1700 so as to perform the operation of the electronic device 200.

Meanwhile, the embodiments of the disclosure described above may be written as a computer-executable program, and the written program may be stored in a machine-readable storage medium.

The machine-readable storage medium may be provided in the form of a non-transitory storage medium. Here, the 'non-transitory storage medium' may refer, for example, to a tangible device and may not include a signal (e.g., an electromagnetic wave), and the term 'non-transitory storage medium' does not distinguish between a case where data is stored in a storage medium semi-permanently and a case where data is stored temporarily. For example, the non-transitory storage medium may include a buffer in which data is temporarily stored.

According to an embodiment of the disclosure, the method according to various embodiments of the disclosure may be included in a computer program product and provided. The computer program products may be traded as commodities between sellers and buyers. The computer program product may be distributed in the form of a machine-readable storage medium (e.g., a disc read-only memory (CD-ROM)), or may be distributed online (e.g., downloaded or uploaded) through an application store or directly between two user devices (e.g., smart phones). In a case of online distribution, at least a portion of the computer program product (e.g., a downloadable app) may be temporarily stored in a machine-readable storage medium such as a manufacturer's server, an application store's server, or a memory of a relay server.

While the disclosure has been illustrated and described with reference to various example embodiments, it will be understood that the various example embodiments are intended to be illustrative, not limiting. It will be further understood by one skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device of a vehicle, the electronic device comprising:
    a mobile communication module comprising communication circuitry configured to transmit and/or receive data through a base station according to a first communication method based on a first frequency band, or a second communication method based on a second frequency band; and
    a control module comprising processing circuitry configured to control an operation of the mobile communication module,
    wherein the control module is configured to:
        determine whether there is a possibility of communication interruption with respect to the first communication method while data is being transmitted and/or received according to the first communication method through the mobile communication module, and
        based on determining that there is the possibility of communication interruption, switch from the first communication method to the second communication method, and transmit and/or receive data according to the second communication method, wherein the first frequency band is higher than the second frequency band,
    wherein whether there is the possibility of communication interruption is determined when a distance between the vehicle and an obstacle on a traveling direction of a beam for the first communication method is less than or equal to a threshold distance, and
    wherein the threshold distance is determined according to a size of the obstacle.

2. The electronic device of claim 1, wherein the first communication method includes a 5th Generation (5G) communication method based on a millimeter wave (mm-Wave) band, and
    the second communication method includes a 5G communication method based on a band of 6 GHz or less, a 4th Generation (4G) communication method, or a 3rd Generation (3G) communication method.

3. The electronic device of claim 1, wherein the control module is configured to determine whether there is the possibility of communication interruption, based on at least one of a performance index value of a signal received from the base station or a position of an antenna module of the mobile communication module.

4. The electronic device of claim 1, wherein the control module is configured to, based on there being no obstacle on the traveling direction of the beam for the first communication method, determine that there is no possibility of communication interruption.

5. The electronic device of claim 1, wherein the control module is configured to, based on the distance between the vehicle and the obstacle being less than or equal to a threshold distance, determined according to a difference between a height of the obstacle and a height of an antenna module of the mobile communication module, determine that there is the possibility of communication interruption.

6. The electronic device of claim 1, wherein the control module is configured to, based on a performance index value of a signal received from the base station being less than or equal to a threshold value, determine that there is the possibility of communication interruption.

7. The electronic device of claim 1, further comprising a device-to-device (D2D) communication module comprising communication circuitry configured to transmit and/or receive data to and from another electronic device using a D2D communication method,
    wherein the control module is configured to, based on reception of at least a specified amount of data being required during data transmission or reception according to the second communication method, transmit, to an electronic device of another vehicle using the first communication method, a request for required data through the D2D communication module.

8. The electronic device of claim 7, wherein the control module is configured to:
    obtain, from a leader vehicle performing platooning, information about vehicles using the first communication method, and
    transmit, to an electronic device of a nearest vehicle among the vehicles using the first communication method, the request for the required data through the D2D communication module.

9. The electronic device of claim 7, wherein the control module is configured to:
    obtain, from a leader vehicle performing platooning, information about vehicles using the first communication method, and
    transmit, to an electronic device of a vehicle having a highest signal strength according to the D2D communication method among the vehicles using the first communication method, the request for the required data through the D2D communication module.

10. The electronic device of claim 7, wherein the control module is configured to:
    classify, based on priority, the required data into first data and second data,
    transmit a request for the first data, to the electronic device of the another vehicle according to the D2D communication method, and
    transmit a request for the second data to the base station according to the second communication method,
    wherein a priority of the first data is higher than a priority of the second data.

11. A method, performed by an electronic device of a vehicle, of controlling communication, the method comprising:
    transmitting and/or receiving data through a base station according to a first communication method, based on a first frequency band;

determining whether there is a possibility of communication interruption with respect to the first communication method; and based on determining that there is the possibility of communication interruption, switching from the first communication method to a second communication method, based on a second frequency band, and transmitting and receiving data, wherein the first frequency band is higher than the second frequency band, wherein whether there is the possibility of communication interruption is determined when a distance between the vehicle and an obstacle on a traveling direction of a beam for the first communication method is less than or equal to a threshold distance, and wherein the threshold distance is determined according to a size of the obstacle.

12. The method of claim 11, wherein the first communication method includes a 5th Generation (5G) communication method based on a millimeter wave (mmWave) band, and the second communication method includes a 5G communication method based on a band of 6 GHz or less, a 4th Generation (4G) communication method, or a 3rd Generation (3G) communication method.

13. The method of claim 11, wherein the determining comprises determining whether there is the possibility of communication interruption, based on at least one of a performance index value of a signal received from the base station or a position of an antenna module of the electronic device.

14. The method of claim 11, further comprising, based on reception of at least a specified amount of data being required during data transmission or reception according to the second communication method, transmitting, to an electronic device of another vehicle using the first communication method, a request for required data according to a device-to-device (D2D) communication method.

15. The method of claim 14, wherein the transmitting of the request for the required data comprises:

obtaining, from a leader vehicle performing platooning, information about vehicles using the first communication method; and transmitting the request for the required data, to an electronic device of a nearest vehicle among the vehicles using the first communication method.

16. The method of claim 14, wherein the transmitting of the request for the required data comprises:

obtaining, from a leader vehicle performing platooning, information about vehicles using the first communication method; and transmitting the request for the required data, to an electronic device of a vehicle having a highest signal strength according to the D2D communication method among the vehicles using the first communication method.

17. The method of claim 14, wherein the transmitting of the request for the required data comprises:

classifying, based on priority, the required data into first data and second data;

transmitting a request for the first data, to the electronic device of the another vehicle according to the D2D communication method; and transmitting a request for the second data to the base station according to the second communication method, wherein a priority of the first data is higher than a priority of the second data.

18. A non-transitory computer-readable recording medium having recorded thereon a program which, when executed by a processor of an electronic device of a vehicle, causes the electronic device to perform operations comprising:

transmitting and/or receiving data through a base station according to a first communication method based on a first frequency band;

determining whether there is a possibility of communication interruption with respect to the first communication method; and based on determining that there is the possibility of communication interruption, switching from the first communication method to a second communication method based on a second frequency band, and transmitting and receiving data, wherein the first frequency band is higher than the second frequency band, wherein whether there is the possibility of communication interruption is determined when a distance between the vehicle and an obstacle on a traveling direction of a beam for the first communication method is less than or equal to a threshold distance, and wherein the threshold distance is determined according to a size of the obstacle.

* * * * *